(12) United States Patent
Tokuda et al.

(10) Patent No.: US 9,842,136 B2
(45) Date of Patent: Dec. 12, 2017

(54) DATABASE MANAGEMENT SYSTEM, COMPUTER, AND DATABASE MANAGEMENT METHOD

(75) Inventors: Seisuke Tokuda, Tokyo (JP); Akira Shimizu, Tokyo (JP); Michiko Yoshida, Tokyo (JP); Nobuo Kawamura, Tokyo (JP); Shinji Fujiwara, Tokyo (JP); Kazuhiko Mogi, Tokyo (JP); Masaru Kitsuregawa, Tokyo (JP); Kazuo Goda, Tokyo (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 408 days.

(21) Appl. No.: 14/397,051

(22) PCT Filed: Apr. 27, 2012

(86) PCT No.: PCT/JP2012/061443
§ 371 (c)(1),
(2), (4) Date: Nov. 7, 2014

(87) PCT Pub. No.: WO2013/161080
PCT Pub. Date: Oct. 31, 2013

(65) Prior Publication Data
US 2015/0112966 A1    Apr. 23, 2015

(51) Int. Cl.
*G06F 7/00* (2006.01)
*G06F 17/30* (2006.01)
*G06F 9/48* (2006.01)

(52) U.S. Cl.
CPC ...... *G06F 17/30463* (2013.01); *G06F 9/4843* (2013.01); *G06F 17/30477* (2013.01); *G06F 2209/485* (2013.01)

(58) Field of Classification Search
CPC ............ G06F 9/4843; G06F 17/30477; G06F 2209/485; G06F 17/30463
See application file for complete search history.

(56) References Cited

U.S. PATENT DOCUMENTS 5,324,525 A * 6/1994 Sakuma ............... C08K 9/12
106/15.05
5,325,525 A    6/1994 Shan et al.
5,701,471 A * 12/1997 Subramanyam .... G06F 11/3428
707/688

(Continued)

FOREIGN PATENT DOCUMENTS

JP    04-314147 A    11/1992
JP    2007-034414 A    2/2007

(Continued)

OTHER PUBLICATIONS

Extended European Search Report received in corresponding European Application No. 12875047.8 dated Feb. 16, 2016.

(Continued)

*Primary Examiner* — Daniel Kuddus
(74) *Attorney, Agent, or Firm* — Mattingly & Malur, PC

(57) ABSTRACT

A database management system (DBMS) generates a query execution plan including information indicating one or more database (DB) operations necessary to execute the query. The DBMS dynamically generates a task for executing the DB operation in execution of the query. The DBMS performs a determination processing of simultaneous-task-generation number when newly creating a task. The determination processing of simultaneous-task-generation number is to calculate the number of simultaneous task generation, which is the number of tasks that can be generated simultaneously, based on the number of tasks which can be newly generated, a first memory resource amount which is the amount of memory resources necessary to be allocated per task newly generated, and a second memory resource amount which is the number of memory resources that can be newly allocated. The number of tasks generated dynamically and simultaneously is equal to or smaller than the calculated number of simultaneously generatable tasks.

16 Claims, 25 Drawing Sheets

(56) References Cited

U.S. PATENT DOCUMENTS

| | | | | |
|---|---|---|---|---|
| 6,931,395 | B2* | 8/2005 | Day | G06F 17/30442 |
| 7,437,725 | B1* | 10/2008 | Chang | G06F 17/30893 |
| | | | | 709/201 |
| 8,356,050 | B1* | 1/2013 | Olston | G06F 17/30896 |
| | | | | 707/769 |
| 8,874,961 | B2* | 10/2014 | Pillai | G06F 11/2023 |
| | | | | 709/223 |
| 2003/0028509 | A1* | 2/2003 | Sah | G06F 17/30595 |
| 2003/0035008 | A1* | 2/2003 | Fuller, III | G06F 9/4443 |
| | | | | 715/771 |
| 2007/0022100 | A1 | 1/2007 | Kitsuregawa et al. | |
| 2009/0254774 | A1* | 10/2009 | Chamdani | G06F 9/4881 |
| | | | | 714/2 |
| 2010/0005077 | A1* | 1/2010 | Krishnamurthy | G06F 17/30463 |
| | | | | 707/E17.136 |
| 2011/0022584 | A1* | 1/2011 | Kitsuregawa | G06F 17/30433 |
| | | | | 707/718 |
| 2014/0108861 | A1* | 4/2014 | Abadi | G06F 9/5066 |
| | | | | 714/11 |
| 2015/0112965 | A1* | 4/2015 | Tokuda | G06F 17/30483 |
| | | | | 707/718 |
| 2016/0246840 | A1* | 8/2016 | Masiero | G06F 17/30979 |

FOREIGN PATENT DOCUMENTS

| | | |
|---|---|---|
| JP | 2007-065978 A | 3/2007 |
| JP | 2011-159107 A | 8/2011 |
| JP | 2011-215812 A | 10/2011 |

OTHER PUBLICATIONS

Idei et al., "Query Plan Riyo Sakiyomi Gijutsu ni Okeru Taju Shori Jikkoji no Seino Model Kento", The Institute of Electronics, Information and Communication Engineers Dai 18 Kai Data Kogaku Workshop Ronbunshu, Jun. 1, 2007.

* cited by examiner

Fig. 3

Query 1

```
SELECT AC1, BC2
FROM A JOIN B ON A.AC2=B.BC1
WHERE A.A_Type='AAA'
```

Fig. 4

Query 2

```
SELECT AC1, BC2
FROM A JOIN B ON A.AC2=B.BC1
WHERE A.A_Type='BBB'
```

Execution plan of Query 1

Execution plan of Query 2

Fig. 11

Query Execution Management Table
424

| Partial query under execution | Priority | Top priority flag | Target execution time | Execution start timing | Execution progress rate |
|---|---|---|---|---|---|
| Partial query 1 | 3 | - | 60 min. | 14:32:11 | 25% |
| Partial query 2 | 2 | - | 30 min. | 14:15:39 | 30% |
| Partial query 3 | 5 | - | 10 min. | 14:35:41 | 12% |

| Allocated memory resource amount | Reserved memory resource amount | Unreserved memory resource amount | Total allocatable memory resource amount |
|---|---|---|---|
| 30MB | 30MB | 5MB | 100MB |
| 10MB | 20MB | | |
| 40MB | 45MB | | |

DATABASE MANAGEMENT SYSTEM, COMPUTER, AND DATABASE MANAGEMENT METHOD

TECHNICAL FIELD

The present invention relates to a database management technique.

BACKGROUND ART

In enterprise activities, utilization of a large amount of generated business data is indispensable. Therefore, a system that analyzes a database (hereinafter, "DB") that stores a large amount of business data, has already been devised.

In this analysis processing, a database management system (hereinafter, "DBMS") receives a query and issues a data read request to storage devices that stores a DB.

As a technique for reducing latency for a data read in an execution of one query, a technique disclosed in PTL 1 is known. According to PTL 1, a DBMS dynamically generates tasks each time data required for query execution is read and executes the tasks in parallel in order to multiplex data read requests. The DBMS allocates, to the dynamically generated tasks, memory resources required for a database operation (hereinafter, "DB operation") executed by the tasks. According to PTL 1, the DBMS compares the number of existing tasks and a predetermined number, and holds off the generation of tasks when the number of existing tasks reaches the predetermined number.

CITATION LIST

Patent Literature

[PTL 1]
Japanese Patent Application Publication No. 2007-34414

SUMMARY OF INVENTION

Technical Problem

It is conceived that a system operation limits a maximum amount of memory resources that can be consumed for an execution of the query (allocatable memory resource amount). The memory resource amount consumed for an execution of one query depends on a DB operation executed in the dynamically generated task or the number of generated tasks and changes according to the progress of the execution of the query. Furthermore, a memory resource amount used when a plurality of queries are simultaneously executed changes depending on a temporal overlapping state in the progress of execution of each query. Therefore, when a limitation is applied to the allocatable memory resource amount, it is desirable to appropriately determine an upper limit of the number of tasks that execute each query in parallel depending on the DB operation executed by the corresponding task.

For example, under a circumstance where the technique of PTL 1 is applied, it is assumed that the DBMS sequentially allocates, to the dynamically generated task, the memory resource necessary in the DB operation executed in the corresponding task. Supposing that an unsuitable value is set as the predetermined value which is limited with the number of current tasks when the DBMS simultaneously executes one or more queries under this circumstance, the following problems (1) and/or (2) may be generated.

(1) The DBMS generates a lot of tasks before the execution result of the query is generated, so that a large amount of memory resources are consumed exceeding the amount of memory resource which can be allocated. As a result, the memory resource is exhausted and thrashing occurs, so that the entire system goes slow.

(2) Although there is a margin in the amount of memory resource which can be allocated, the number of tasks simultaneously executed by the DBMS is reduced. As a result, multiplicity of the data read request is insufficient, and thus, it is difficult to obtain sufficient performance.

In this regard, the objective of this invention is to set the number of tasks dynamically generated in query execution to a suitable number under a circumstance where the allocatable memory resource amount is limited, and to reduce the query execution time within such a limitation range.

Solution to Problem

A DBMS includes a query receiving unit, a query execution plan creating unit, and a query execution unit. For example, the DBMS is a computer program. As the DBMS is executed using a computer, the DBMS builds up the query receiving unit, the query execution plan creating unit, and the query execution unit in the computer.

The query receiving unit receives a query. The query execution plan creating unit generates a query execution plan including information indicating one or more DB operations necessary to execute the query. The query execution unit executes the received query based on the generated query execution plan.

In the execution of the query, the query execution unit dynamically generates a task for executing the DB operations and executes the dynamically generated tasks. Specifically, for example, in the execution of the query, the query execution unit performs: (a) generating a task for executing the DB operation; (b) issuing a data read request to a DB in order to read data necessary for the DB operation corresponding to the generated task by executing the generated task; (c) when the (N+1)th DB operation is executed based on an execution result of the N-th DB operation corresponding to the task executed in (b), newly generating a task based on the execution result (N is an integer equal to or larger than 1); and (d) performing (b) and (c) for the task newly generated. When two or more executable tasks are present in (b) and (d), the query execution unit executes at least two tasks in parallel among the two or more tasks. This operation of the query execution unit may be an operation conforming to the technique disclosed in PTL 1.

In the execution of the query, the query execution unit performs a determination processing of simultaneous-task-generation number when newly creating a task (for example, in the case of (a) or (c)). The determination processing of simultaneous-task-generation number is to calculate the number of simultaneous task generation which is the number of tasks that can be generated simultaneously, based on the number of generatable tasks which is the number of tasks that can be newly generated, a first memory resource amount which is the amount of memory resources necessary to be allocated per task newly generated, and a second memory resource amount which is the amount of memory resources that can be newly allocated. The number of tasks generated dynamically and simultaneously is equal to or smaller than the calculated number of simultaneously generatable tasks.

Advantageous Effects of Invention

It is possible to set the number of dynamically generated tasks in execution of a query to a suitable number under a circumstance where the allocatable memory resource amount is limited. Specifically, under a circumstance where the allocatable memory resource amount is limited, it is possible to expect that the data read request is issued at the highest multiplicity within such a limitation range, therefore, it is possible to expect that a query execution time is reduced.

BRIEF DESCRIPTION OF DRAWINGS

FIG. 3 shows Query 1 according to Embodiment 1.

FIG. 4 shows Query 2 according to Embodiment 1.

FIG. 11 shows a configuration of a query execution management table according to Embodiment 1.

DESCRIPTION OF EMBODIMENTS

Several embodiments will be described below with reference to the drawings. Note that the present invention is not limited by the following description. In the following description, a database is referred to as "DB", a database management system is referred to as "DBMS", and a server that executes the DBMS is referred to as "DB server". An issue source of a query to the DBMS may be a computer program (e.g., an application program) outside the DBMS. The outside computer program may be a program executed in the DB server or may be a program executed by an apparatus (e.g., a client computer) coupled to the DB server.

[Embodiment 1]

First, an overview of this embodiment is described.

The DB server executes the DBMS. The DBMS receives a query and executes the received query. The DBMS returns a result generated by the execution to an issue source of the query. The DBMS executes one or more DB operations to generate the result of the query. In the execution of at least one DB operation among the DB operations, the DBMS sometimes issues a read request to a storage device that stores the DB.

Figure 1:
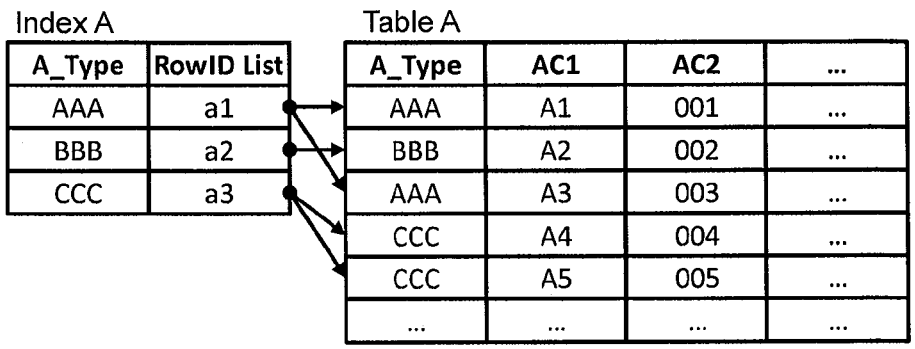
FIG. 1 shows Index A and Table A according to Embodiment 1.
Figure 2:
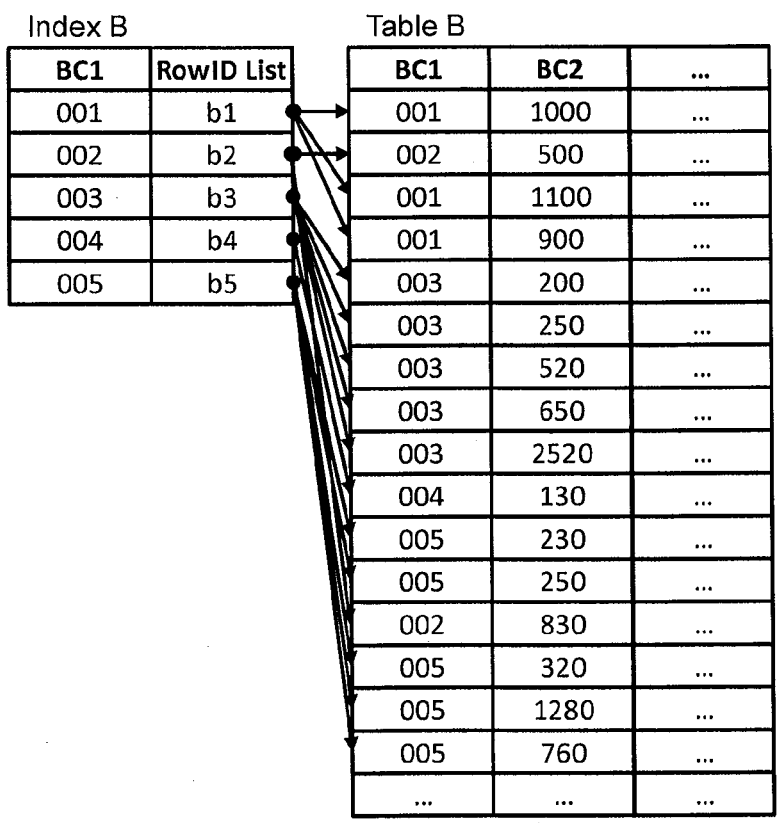
FIG. 2 shows Index B and Table B according to Embodiment 1.

For example, it is assumed that the DBMS stores, in the storage device (e.g., an external storage apparatus communicably coupled to the DB server), a DB including an index A, a table A, an index B, and a table B shown in FIG. 1 and FIG. 2. The table is a set of one or more records. The record is configured from one or more columns. The index is a data structure created targeting one or more columns in the table and increases the speed of access to the table according to a selection condition including the columns targeted by the index. For example, the index is a data structure that retains information (RowID) for specifying, for each value of the target columns, a record in the table including the value. A B-tree structure or the like is used.

For example, the DBMS may specify two records (first and second records) of Table A from a RowID List "a1," which is a set of RowIDs, corresponding to the record "AAA" which is a value of the column "A_Type" of Table A. In addition, it is assumed that a value of the column AC2 of Table A is associated with a value of the column BC1 of Table B. In this case, the DBMS specifies a record including a value corresponding the column A_Type from Table A using RowID List of Index A in a certain value of the column A_Type. In addition, each value of the columns AC1 and AC2 or the like included in the specified record is obtained. In addition, the DBMS specifies a record including the value of the column BC1 of Table B associated with the value AC2 obtained in advance, using RowID List of Index B. As a result, the DBMS can obtain values of the columns BC2 and the like included in the record of Table B specified in advance by associating values of each column between Table A and Table B.

For example, the query received by the DBMS is Query 1 shown in FIG. 3 and Query 2 shown in FIG. 4. Query 1 is a query for extracting a value of the column AC1 of Table A and a value of the column BC2 of Table B out of records of Table A and Table B where a value of the column A_Type of Table A is "AAA," and a value of the column AC2 of Table A matches a value of the column BC1 of Table B. Similarly, Query 2 is a query for extracting a value of the column AC1 of Table A and a value of the column BC2 of Table B out of records of Table A and Table B where a value of the column A_Type of Table A is "BBB", and a value of the column AC2 of Table A matches a value of the column BC1 of Table B.

Figure 5:
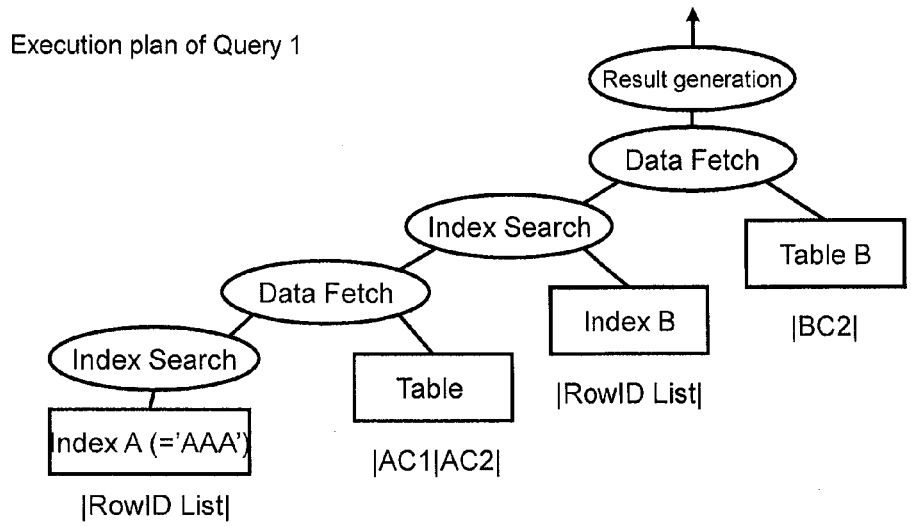
FIG. 5 shows an execution plan of Query 1 according to Embodiment 1.
Figure 6:
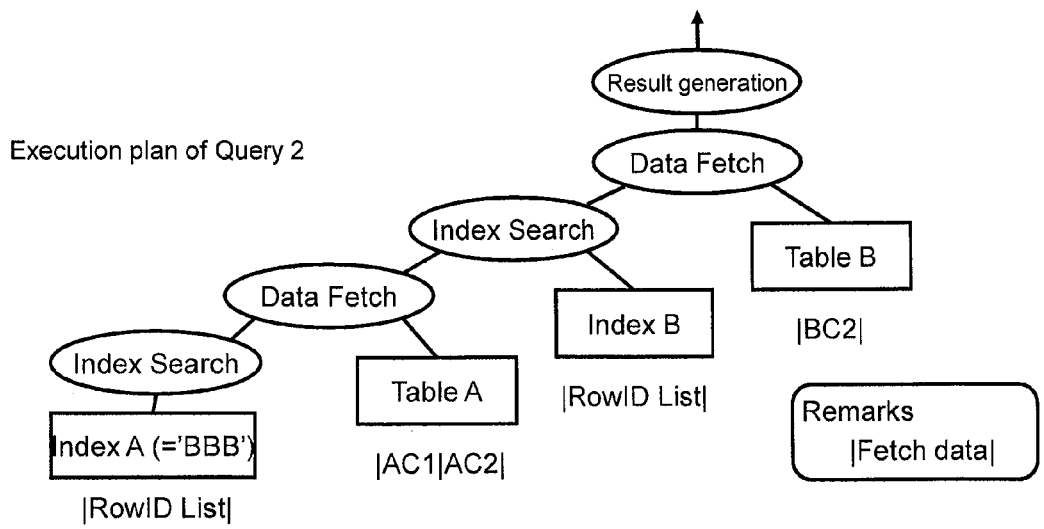
FIG. 6 shows an execution plan of Query 2 according to Embodiment 1.

The DBMS generates a query execution plan, for example, shown FIGS. 5 and 6 in order to execute Query 1 and Query 2 described above. The query execution plan includes, for example, information representing one or more DB operation that causes data reading. An execution sequence of the DB operation in the query execution plan has a tree structure. The DBMS extracts values of the columns AC1 and AC2 out of records including a designated value of the column A_Type of Table A using Index A based on the query execution plan of Query 1 or 2. Moreover, in use of Index B the DBMS extracts a value of the column BC2 out of records including a value of the column BC1 of Table B matching the extracted value of the column AC1. The DBMS generates the extracted value, that is, the values of the columns AC1 and BC2, as a result of the query execution. Specifically, the DBMS performs the following processing:

(S1) searching RowID List corresponding to a record of Table A including a designated value of the column A_Type using Index A;
(S2) fetching data including a record corresponding to Table A using RowID List searched in Step (S1) and extracting values of the columns AC1 and AC2 of the corresponding record;
(S3) searching RowID List of a record of Table B including a value of the column BC1 matching the value of the column AC2 extracted in step (S2) using Index B;
(S4) fetching data including the record corresponding to Table B using RowID List searched in step (S3) and extracting a value of the column BC2 of the corresponding record; and
(S5) creating a value of the extracted columns AC1 and BC2 as a result of the query execution and return it to the query issuing source.

Figure 7:
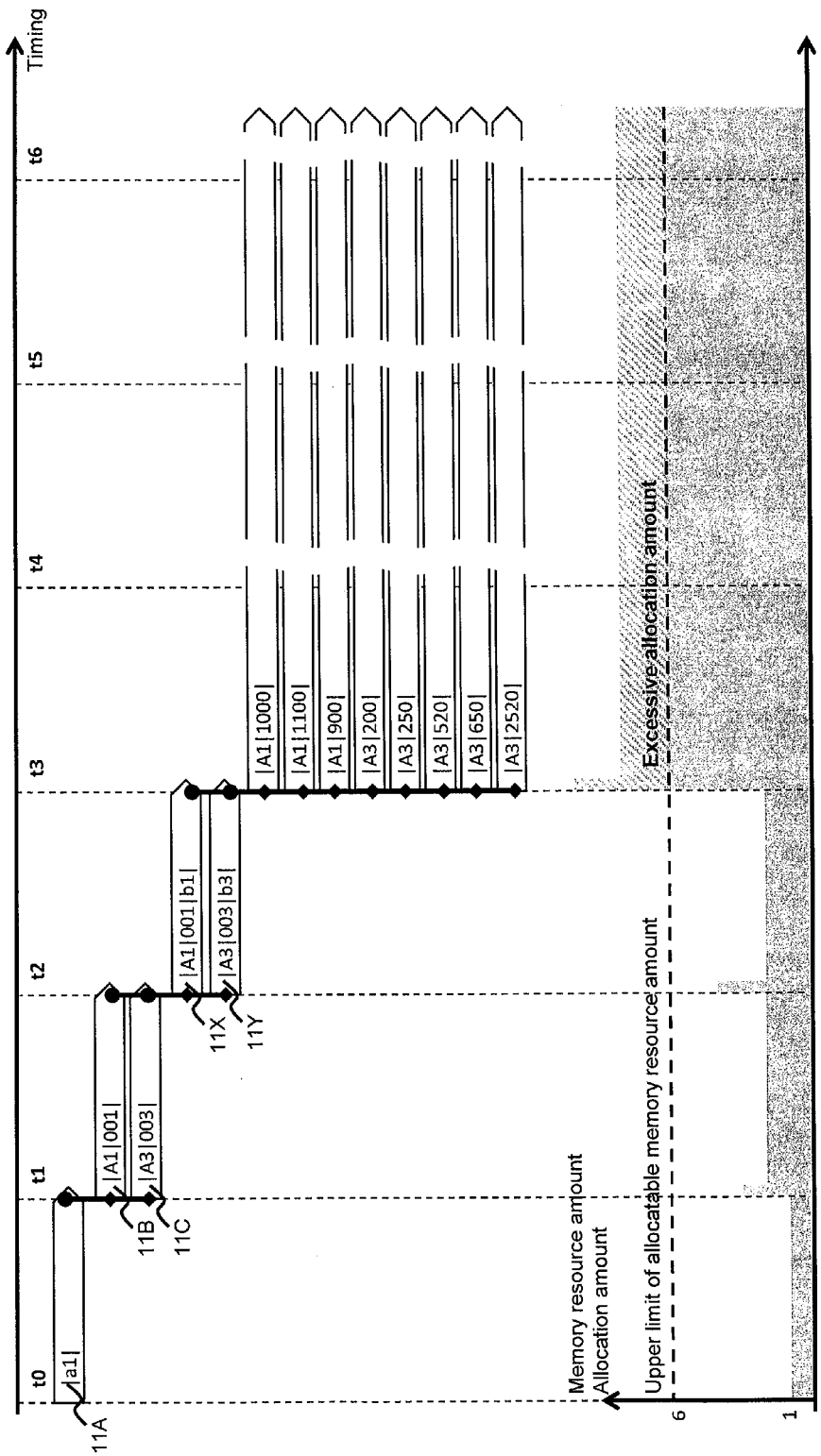
FIG. 7 is an exemplary schematic diagram showing exhaustion of memory resources.

As described above, the DBMS executes a query according to the query execution plan. If the DBMS dynamically generates tasks without consideration of a maximum amount of memory resources (allocatable memory resource amount) that can be consumed when Query 1 of FIG. 3 is executed according to the query execution plan of FIG. 5, a problem may occur as shown in FIG. 7 (memory resources are exhausted to generate thrashing). Hereinafter, such a problem will be described. It is noted that a description for FIG. 7 will be made based on the following rules.

(*) An abscissa indicates timings.
(*) A long pentagonal box in the upper half of the drawing represents a DB operation caused by one task. The left end of the pentagonal box indicates a timing at which a task is generated, and a DB operation of the corresponding task starts. The right end of the pentagonal box indicates a timing at which the DB operation of the corresponding task is terminated, and the corresponding task is terminated.
(*) Numerals inside the pentagonal box in the upper half of the drawing denote data fetched through the DB operation corresponding to the task and fetched data necessary to generate the result.
(*) An ordinate in the lower half of the drawing indicates an amount of memory resource consumed in execution of a query (an amount of memory resource allocated).
(*) It is assumed that an upper limit of the allocatable memory resource amount (hereinafter, a "upper allocation limit") is set to "6."
(*) It is assumed that a memory resource amount necessary in the DB operation corresponding to one task is set to "1." It is noted that the memory resource necessary to generate a task itself is managed separately from the memory resource consumed in execution of the query.

In the technique of PTL 1, one or more tasks can be dynamically generated based on a result of a DB operation executed by a task. In the example of FIG. 7, the DBMS executes Query 1 as follows.

(t0) A task 11A for accessing Index A is generated. In the task 11A, a search of RowID List is performed for a record having a value of the column A_Type of Table A set to "AAA." The DBMS executes the task 11A by allocating a memory resource necessary in execution of the task 11A.
(t1) RowID List "a1" is obtained through execution of the task 11A. The DBMS generates tasks 11B and 11C for fetching data of Table A based on a result of the execution. In the task 11B, data including the first record of Table A is fetched. In the task 11C, data including the third record of Table A is fetched. The DBMS allocates each memory resource necessary to execute the tasks 11B and 11C and executes the tasks 11B and 11C. Then, the memory resource allocated to the task 11A is released, and the task 11A is terminated.
(t2) Through the execution of the task 11B, the value "A1" of the column AC1 and the value "001" of the column AC2 are extracted from the data including the first record of Table A fetched. The DBMS generates a task 11X for accessing Index B based on a result of the execution. In the task 11X, a search of RowID List is performed for the record of Table B having a value of the column BC1 matching the extracted value of the column AC2. The DBMS executes the task 11X by allocating a memory resource necessary to execute the task 11X. It is noted that the DBMS sets, to the memory resource allocated to the task 11X, the value "A1" of the column AC1 which is data for creating a result of the query and the value "001" of the column AC2 which is data necessary to perform the DB operation corresponding to the task 11X (search of RowID List to Index B). Then, the DBMS releases the memory resource allocated to the task 11B and terminates the task 11B. Similarly, the DBMS extracts a value "A3" of the column AC1 and a value "003" of the column AC2 from the data including the third record of Table A fetched through the execution of the task 11C. The DBMS generates the task 11Y for accessing Index B based on a result of the execution. In the task 11Y, a search of RowID List is performed for the record of Table B having a value of the column BC1 matching the extracted value of the column AC2. The DBMS executes the task 11Y by allocating a memory resource necessary to execute the task 11Y. It is noted that the DBMS sets, to the memory resource allocated to the task 11Y, a value "A3" of the column AC1 which is data for creating a result of the query and a value "003" of the column AC2 which is data necessary to perform the DB operation corresponding to the task 11Y (search of RowID List to Index B). Then, the DBMS releases the memory resource allocated to the task 11C and terminates the task 11C.

At the timing t2, the amount of allocated memory resources consumed to execute the query does not exceed the upper allocation limit "6."

However, as time elapses, the amount of memory resources being allocated to execution of the query changes (increases or decreases). If the DBMS generates tasks dynamically without considering the upper allocation limit, the memory resource consumption amount exceeds the upper allocation limit "6" as shown in FIG. 7. As a result, the memory resource may be exhausted. In FIG. 7, the DBMS performs the following processing at the timing t3.

(t3) RowID List "b1" is obtained by executing the task 11X. The DBMS generates three tasks for fetching each data including three records of Table B based on a result of the execution and allocates each memory resource necessary in the execution. In addition, at the timing t3, the DBMS obtains RowID List "b3" by executing the task 11Y. The DBMS generates five tasks for fetching each data including five records of Table B based on a result of the execution and tries to respectively allocate memory resources necessary in the execution.

That is, the DBMS generates eight tasks and tries to respectively allocate a memory resource to each of the tasks at t3. However, since the upper allocation limit is set to "6," memory resource for being allocated to the task is exhausted, so that thrashing occurs. As a result, the entire system goes slow. Here, the upper allocation limit may change as time elapses. For example, when a computer program other than the DBMS is executed, or when the DBMS is built in a virtual machine generated and executed by a virtualization program, the total memory resource amount of the virtual machine may change.

In this regard, according to this embodiment, the DBMS performs a determination processing of simultaneous-task-generation number whenever the DBMS newly generate a task. In the determination processing of simultaneous-task-generation number, the number of simultaneous task generation which is the number of tasks that can be generated simultaneously is calculated based on the number of generatable tasks, which is the number of tasks that can be newly generated, a first memory resource amount which is a memory resource amount necessary to allocate the memory resource to each of the tasks newly generated, and a second memory resource amount which is a memory resource amount that can be newly allocated. In this embodiment, the first memory resource amount is a memory resource amount based on the memory resource amount necessary in the DB operation corresponding to the task newly generated (DB operation memory resource amount). For example, the first memory resource amount is a memory resource amount larger than the DB operation memory resource amount, or is a memory resource amount smaller than the DB operation memory resource amount if the memory resource is shared with other task. The number of tasks generated simultaneously may not be equal to the number of simultaneous task generation or may be smaller than the number of simultaneous task generation.

Figure 8:
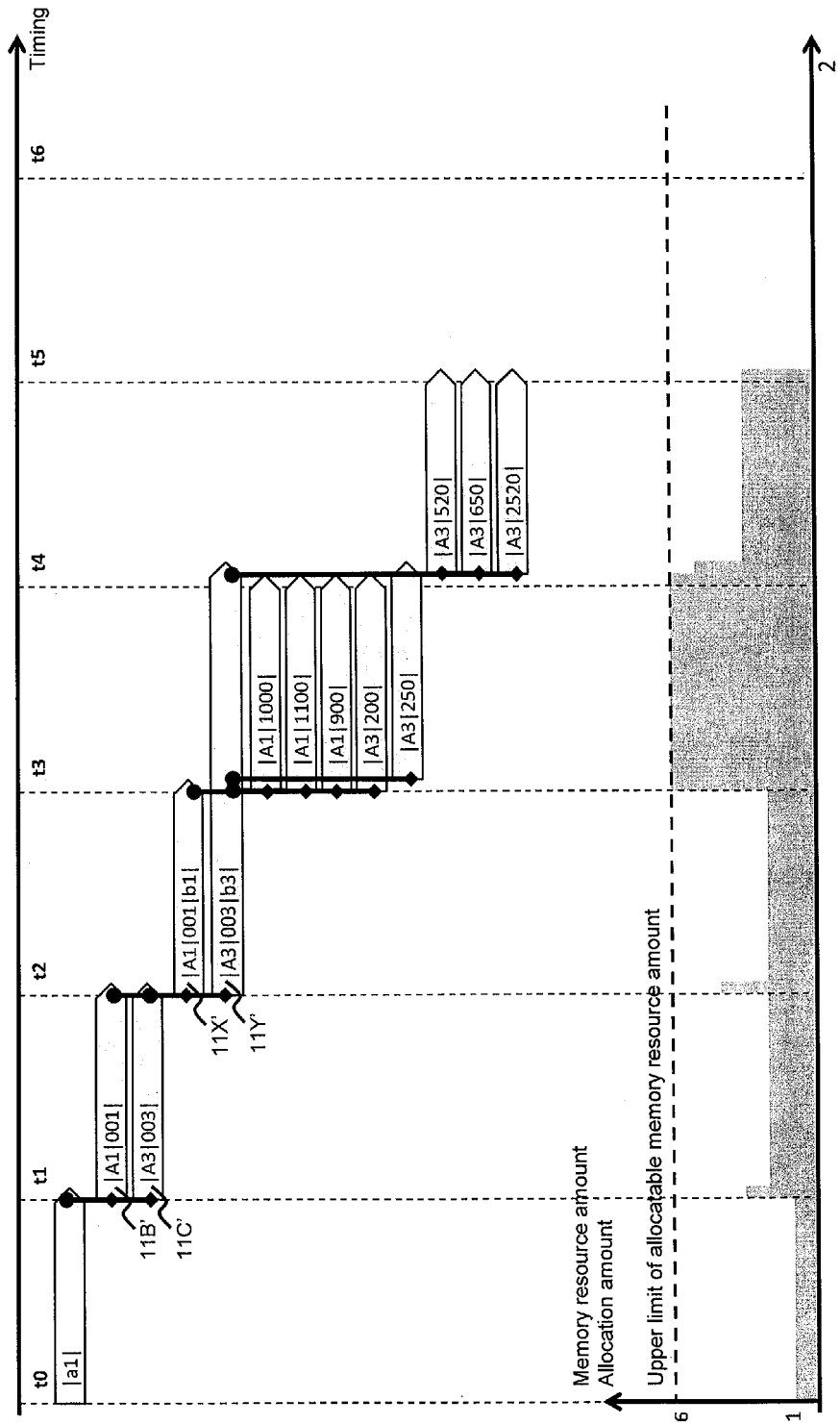
FIG. 8 is an exemplary schematic diagram showing how to avoid exhaustion of memory resources in execution of Query 1 n Embodiment 1.

FIG. 8 shows an exemplary schematic diagram showing how to avoid exhaustion of memory resources when the DBMS executes Query 1 of FIG. 3 according to the query execution plan of FIG. 5. The description rule is similar to that of FIG. 7. In FIG. 8, the DBMS executes Query 1 as follows.

(t0) The determination processing of simultaneous-task-generation number is performed when a task for accessing Index A is generated. For example, the DBMS calculates the number of simultaneous task generation as "1" based on the number of generatable tasks set to "1," the first memory resource amount set to "1," and the second memory resource amount set to "6" (equal to the upper allocation limit set to "6"). The DBMS generates tasks with the same number of the calculated number of simultaneously generatable tasks "1," and executes the tasks by allocating a memory resource necessary in the corresponding DB operation.

(t1) Based on the result of the task executed at the timing to, the determination processing of simultaneous-task-generation number is performed when two tasks for fetching each data including two records of Table A are generated. For example, the DBMS calculates the number of simultaneous task generation as "2" based on the number of generatable tasks set to "2," the first memory resource amount set to "1," and the second memory resource amount set to "5" (which is a value obtained by subtracting the allocated memory resource amount "1" from the upper allocation limit "6"). The DBMS generates the tasks 11B' and 11C' with the same number of the calculated number of simultaneously generatable tasks "2" and executes the tasks by allocating memory resources necessary in the corresponding DB operation.

(t2) Based on a result of the execution of the task 11B', the determination processing of simultaneous-task-generation number is performed when one task for accessing Index B is generated. For example, the DBMS calculates the number of simultaneous task generation as "1" based on the number of generatable tasks set to "1," the first memory resource amount set to "1," and the second memory resource amount set to "4" (which is a value obtained by subtracting the allocated memory resource amount "2" from the upper allocation limit "6"). The DBMS generates tasks 11X' with the same number of the calculated number of simultaneously generatable tasks "1" and executes the tasks by allocating memory resources necessary in the corresponding DB operation. Similarly, for the task 11C', the determination processing of simultaneous-task-generation number is performed when one task is generated based on a result of the execution, so that the number of simultaneous task generation is calculated as "1." The DBMS generates the task 11Y' with the same number as the calculated number of simultaneously generatable tasks "1" and executes the task by allocating a memory resource necessary in the corresponding DB operation.

The memory resource amount consumed in the query execution does not exceed the upper allocation limit "6" until the timing t2. For this reason, a behavior of the executed task and the memory resource amount consumed in the query execution change as shown in FIG. 7.

At the timing t3, when the DBMS newly generates a task, unlike FIG. 7, the number of tasks generated and executed simultaneously is not set to "8" as described below, and it is possible to avoid exhaustion of memory resources.

(t3) Based on a result of the execution of the task 11X', the determination processing of simultaneous-task-generation number is performed when three tasks for fetching each data including three records of Table B are generated. For example, the DBMS calculates the number of simultaneous task generation as "3" based on the number of generatable tasks set to "3," the first memory resource amount set to "1," and the second memory resource amount set to "4" (which is a value obtained by subtracting the allocated memory resource amount "2" from the upper allocation limit "6"). The DBMS generates three tasks corresponding to the calculated number of simultaneously generatable tasks and executes the tasks by allocating memory resources necessary in the corresponding DB operation. Similarly, based on a result of the execution of the task 11Y', the determination processing of simultaneous-task-generation number is performed when five tasks for fetching each data including five records of Table B. For example, the DBMS calculates the number of simultaneous task generation as "1" based on the number of generatable tasks set to "5," the first memory resource amount set to "1," and the second memory resource amount set to "1" (which is a value obtained by subtracting the allocated memory resource amount "5" from the upper allocation limit "6"). The DBMS generates tasks with the same number as the calculated number of simultaneously generatable tasks "1" and executes the tasks by allocating memory resources necessary in the corresponding DB operation. In this case, for the task 11Y', the number of tasks that can be generated anew based on the result of the execution is "4." Therefore, the DBMS defers generation of a task based on the task 11Y' until a new task can be generated. Meanwhile, for the task 11X', all of three tasks that can be generated based on the result of execution are already generated and start to be executed. Therefore, the DBMS releases the memory resource allocated to the task 11X' and terminates the task 11X' (immediately after the timing t3). Since the second memory resource amount which is the memory resource amount that can be newly allocated becomes "1" as the task 11X' is terminated, the DBMS performs the determination processing of simultaneous-task-generation number for the task 11Y' which is waiting for task generation. Through this processing, the number of simultaneous task generation is calculated as "1," and a task is generated with the same number as the calculated number of simultaneously generatable tasks, so that the task is executed by allocating a memory resource. Since the number of tasks that can be newly generated based on the result of the execution for the task 11Y' is "3," the DBMS defers generation of a task based on the task 11Y' until a task can be newly generated.

(t4) For four tasks executed at the timing t3, the execution is completed to generate a result of the query. The DBMS releases the memory resources allocated to each of the four executed tasks and terminates the tasks (immediately after the timing t4). As a result, since the second memory resource amount becomes "4," the DBMS performs the determination processing of simultaneous-task-generation number for the task 11Y' which is waiting for task generation. Through this processing, the number of simultaneous task generation is calculated as "3," and tasks are generated with the same number as the calculated number of simultaneously generatable tasks, so that the tasks are executed by allocating memory resources.

(t5) The execution of overall tasks executed until the timing t4 is completed, and a result of the query is generated.

In this manner, in Embodiment 1, the DBMS determines the number of simultaneous task generation through the determination processing of simultaneous-task-generation number whenever a task is newly generated. In addition, the total number of tasks generated dynamically is set to be equal to or smaller than the number of simultaneous task generation based on a result of execution for the DB operation corresponding to the task. As a result, the memory resource amount consumed by the query execution does not exceed the upper allocation limit. Therefore, it is possible to avoid exhaustion of memory resources allocated to a task. If the number of tasks generated simultaneously is set to be equal to the number of simultaneous task generation, it is possible to issue the data read request at the highest multiplicity within a range of the upper allocation limit. Therefore, it is possible to reduce the query execution time. It is noted that the "simultaneously generated task" refers to a task generated at the substantially same time range based on a result of any DB operation.

Figure 9:
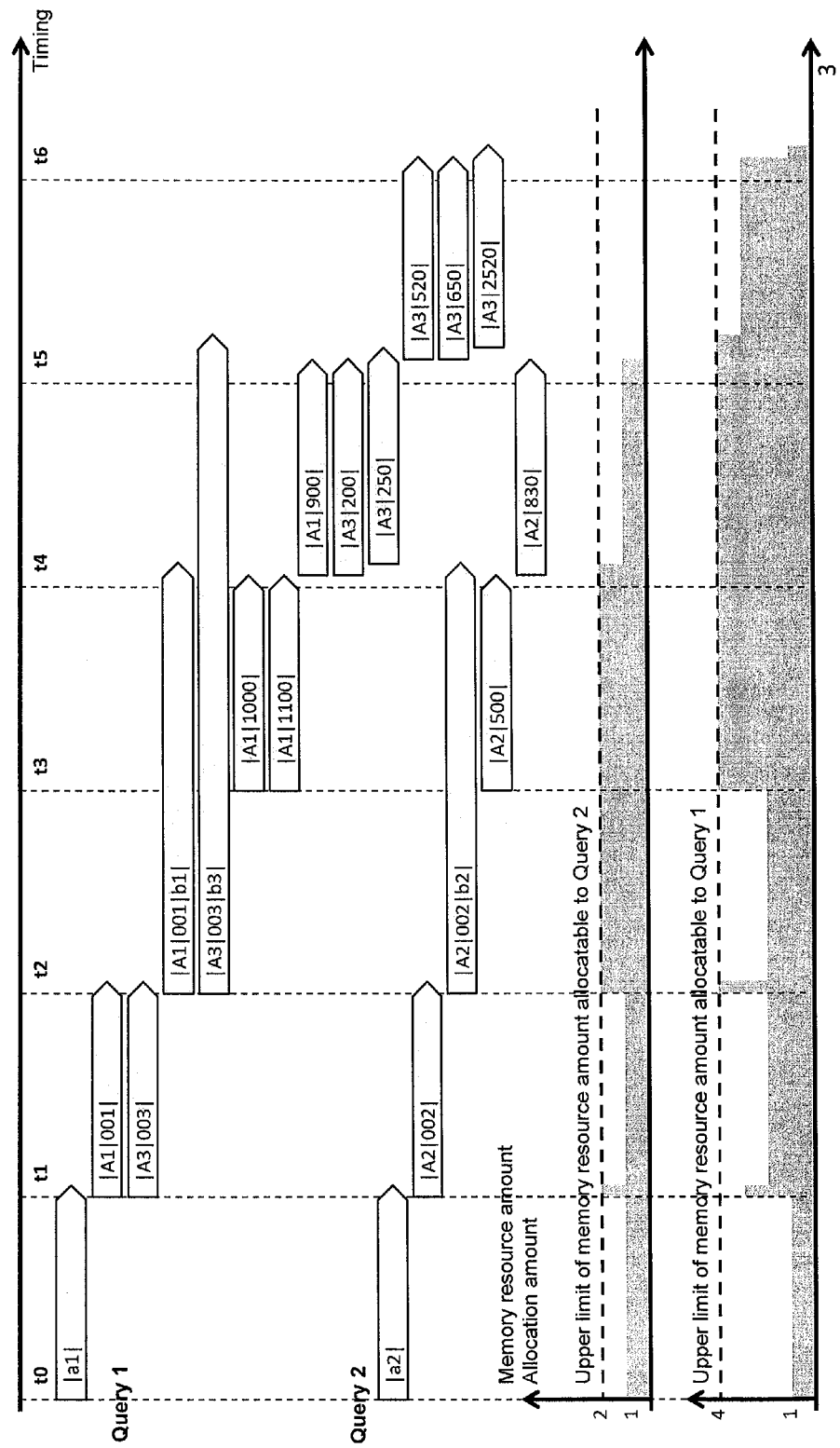
FIG. 9 is an exemplary schematic diagram showing how to avoid exhaustion of memory resources in simultaneous execution of Query 1 and Query 2 in Embodiment 1.

In Embodiment 1, even when the DBMS receives a plurality of queries, and a plurality of the received queries are executed in parallel, it is possible to avoid exhaustion of memory resources to be allocated to the tasks. FIG. 9 is an exemplary schematic diagram showing a case where the DBMS receives Query 1 of FIG. 3 and Query 2 of FIG. 4 simultaneously, and two queries are executed in parallel according to the query execution plan of FIGS. 5 and 6. The description rule is similar to that of FIG. 7. In Embodiment 1, the DBMS prepares priorities for each executed query. As shown in FIG. 9, based on such priorities, the DBMS distributes the upper allocation limit "6" for each of the executed queries. For example, the DBMS allocates more memory resources out of the allocatable memory resource amount as the priority is higher. In Embodiment 1, as a numerical value indicating the priority increases, the query has higher priority. For example, if Query 1 and Query 2 are received simultaneously, and a priority of Query 1 is higher than that of Query 2, the DBMS sets "4" out of the upper allocation limit "6" as the upper limit of the allocatable memory resource amount for the execution of Query 1, and the DBMS sets "2" out of the upper allocation limit "6" as the upper limit of the allocatable memory resource amount for the execution Query 2. The DBMS performs the determination processing of simultaneous-task-generation number whenever a new task is generated in the execution of each query. That is, the DBMS calculates a number of simultaneously generatable tasks for each query based on the upper limit of the allocatable memory resource amount corresponding to each query. In addition, in execution of each query, the number of tasks newly generated is set to be equal to or smaller than the calculated number of simultaneously generatable tasks.

As described above, if a total memory resource amount consumed when a plurality of queries are executed in parallel is set to be equal to or smaller than the upper allocation limit, it is possible to avoid exhaustion of memory resources to be allocated to a task. In addition, by setting the number of tasks generated simultaneously to be equal to the number of simultaneous task generation, it is possible to issue the data read request of each query at the maximum multiplicity corresponding to a priority of each query within a range of the upper allocation limit. Therefore, it is possible to reduce the execution time of each query depending on priorities of each query.

It is noted that the upper limit of the allocatable memory resource amount in execution of each query may change as:
(1) a total number of queries executed simultaneously changes, or
(2) a priority of at least one query changes.

FIGS. 7 to 9 are schematic diagrams showing overview images. The DBMS may not initiate a plurality of tasks at the same timing.

Hereinafter, Embodiment 1 will be described in detail.

Figure 10:
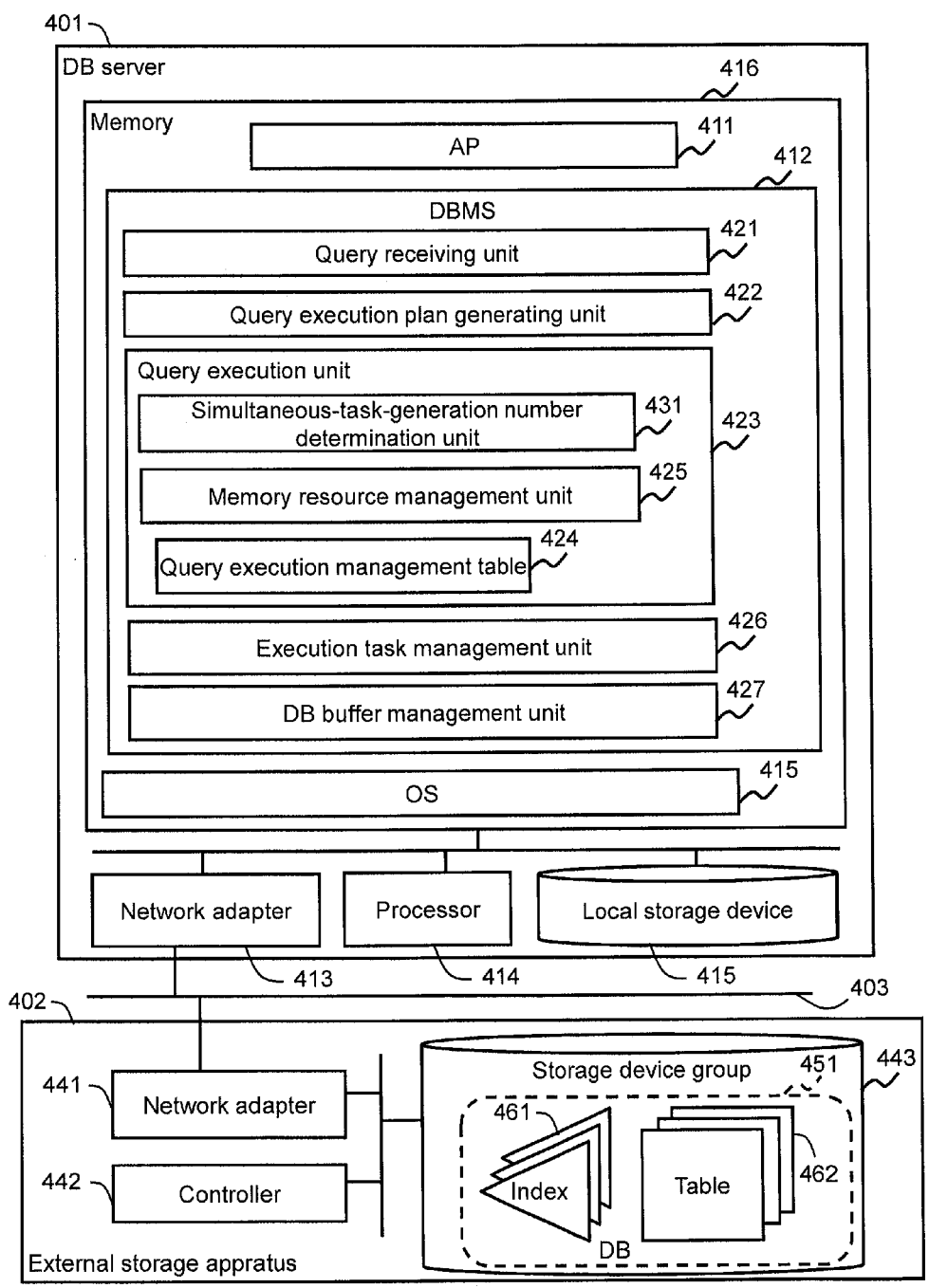
FIG. 10 shows a configuration of the computer system according to Embodiment 1.

FIG. 10 shows a configuration of the computer system according to Embodiment 1.

A DB server 401 is coupled to an external storage apparatus 402 via a communication network 403. As a protocol of communication via the communication network 403, for example, an FC (Fibre Channel), an SCSI (Small Computer System Interface), or a TCP/IP (Transmission Control Protocol/Internet Protocol) may be adopted.

The DB server 401 is a computer, for example, a personal computer, a work station, or a main frame or a virtual computer (a virtual machine) configured by any one of these. The DB server 401 includes a network adapter 413, a memory 416, a local storage device 415, and a processor (typically, a microprocessor) 414 connected thereto. The processor 414 executes computer programs, for example, an OS (Operating System) 415, a DBMS 412, and an AP (Application Program) 411 for issuing a query to the DBMS 412. The memory 416 temporarily stores a program executed by the processor 414 and data used by the program. The local storage device 415 stores the program and the data used by the program. The network adapter 413 connects the communication network 403 and the DB server 401. The AP 411 may operate on not-shown another computer coupled to the communication network 403 rather than on the DB server 401. The processor 414 may be an element included in a control device coupled to the network adapter 413, the memory 416, and the like. The control device may include, other than the processor 414, a dedicated hardware circuit (e.g., a circuit that performs encryption and/or decryption of data).

Note that, from viewpoints of performance and redundancy, the DB server 401 may include a plurality of at least one elements among the processor 414, the memory 416, the local storage device 415, and the network adapter 413. The DB server 401 may include an input device (e.g., a keyboard and a pointing device) and a display device (e.g., a liquid crystal display) not shown in the figure. The input device and the display device may be integrated.

In the DB server 401, the DBMS 412 executes a query issued from the AP 411. In executing the query, the DBMS 412 issues an I/O request for a DB 451 stored in the external storage apparatus 402 to the OS 415. The OS 415 transmits the I/O request issued from the DBMS 412 to the external storage apparatus 402.

In this embodiment, the external storage apparatus 402 is a device including a plurality of storage devices 443 like a disk array device. Instead of the device, the external storage apparatus 402 may be a single storage device. The external storage apparatus 402 stores data and a program used by the DB server 401. The external storage apparatus 402 receives an I/O request from the DB server 401, executes processing corresponding to the I/O request, and transmits a processing result to the DB server 401.

The external storage apparatus 402 includes a network adapter 441, a storage device group 443, and a controller 442 connected thereto.

The network adapter 441 connects the external storage apparatus 402 to the communication network 403.

The storage device group 443 includes one or more storage devices. The storage device is a nonvolatile storage medium, for example, a magnetic disk, a flash memory, or other semiconductor memories. The storage device group 443 may be a group that stores data at a predetermined RAID level according to a RAID (Redundant ARRAY of Independent Disks). A logical storage device (a logical volume) may be provided to the DB server 401 on the basis of a storage space of the storage device group 443. The storage device group 443 stores the DB 451.

The controller 442 includes, for example, a memory and a processor. The controller 442 inputs data to and outputs data from the storage device group 443, which stores the DB 451, according to an I/O request from the DB server 401. For example, the controller 442 stores, in the storage device group 443, writing target data conforming to a writing request from the DB sever 401. The controller 442 reads out, from the storage device group 443, read target data conforming to a read request from the DB sever 401 and transmits the data to the DB server 401.

Note that, from viewpoints of performance and securing of redundancy, the external storage apparatus 402 may include a plurality of elements such as the controllers 442.

The DBMS 412 manages the DB 451 including business data. The DB 451 includes one or more tables 462 or indices 461. The table is a set of one or more records, and the record consists of one or more columns. The index is a data structure generated for one or more columns of the table and facilitates fast access to the table based on a selection condition including the column corresponding to the index. For example, the index is a data structure that stores information (RowID) for specifying a record of the table including values of each column to match each value of the target column. The index may have a B-tree structure and the like. An exemplary configuration of the table of the DB or an exemplary relationship between tables is shown in FIGS. 1 and 2.

The DBMS 412 includes a query receiving unit 421, a query execution plan generation unit 422, a query execution unit 423, an execution task management unit 426, and a DB buffer management unit 427.

The query receiving unit 421 receives a query issued by the AP 421. The query is described in, for example, an SQL (Structured Query Language).

The query execution plan generation unit 422 generates, concerning the query received by the query receiving unit 421, a query execution plan including information representing one or more DB operations necessary for executing the query. The query execution plan is, for example, information in which an execution order of the DB operations, which should be performed in execution of the query, is defined by a tree structure. The query execution plan is stored in the memory 416. The query execution plan may include, for each of the DB operations, information representing an amount of memory resources required in execution by a task. For example, in the case of a query execution plan including information representing a DB operation for reading out a record of a certain table, the query execution plan may include information concerning a memory resource amount for storing the record of the table in the memory 416. An example of the query execution plan is as shown in FIGS. 5 and 6.

The execution task management unit 426 manages a task for executing the query. For example, the execution task management unit 426 manages memory resources for generating a task and, according to a generation request for a task from the query execution unit 423, secures memory resources required for the task itself and generates the task. The execution task management unit 426 releases the memory resources required for the task itself and ends the task according to an end request for the task from the query execution unit 423. As the task, any module can be adopted. For example, the task may be a process or a thread managed by the OS 415 or may be a pseudo process or a pseudo thread implemented by the DBMS 412.

The DB buffer management unit 427 manages a storage area (a DB buffer) for temporarily storing data in the DB 451. The DB buffer is built on the memory 416. The DB buffer may be built on the local storage device 415.

The query execution unit 423 dynamically generates and executes, according to the query execution plan generated by the query execution plan generation unit 422, tasks for executing a DB operation, which is information included in the query execution plan. The query execution unit 423 returns an executed result to a query issue source. For example, the query execution unit 423 (a) requests the execution task management unit 426 to generate a task for executing the DB operation, (b) executes the generated task to read data necessary for the DB operation corresponding to the task (issue a read request to the external storage apparatus 402 including the DB 451 via the OS 415), (c) when a (N+1) th DB operation is executed on the basis of an execution result of an N-th DB operation corresponding to the task executed in (b), requests the execution task management unit 426 to generate a task based on a result of the execution anew (N is an integer equal to or larger than 1), and (d) performs (b) and (c) concerning the task generated anew. When two or more executable tasks are present in (b) and (d), the query execution unit 423 executes at least two tasks among the two or more tasks in parallel.

The query execution unit 423 includes a simultaneous-task-generation number determination unit 431 that determines the number of simultaneous task generation which is the number of tasks that can be generated simultaneously when a new task is generated, a memory resource management unit 425 that manages memory resources allocatable to execution of a query, and a query execution management table 424 that has information regarding execution of the query.

The processing in the query receiving unit 421, the query execution plan creating unit 422, the execution task management unit 426, the DB buffer management unit 427, and the query execution unit 423 (the simultaneous-task-generation number determination unit 431 and the memory resource management unit 425) are implemented by causing the processor 414 to execute the DBMS 412. Out of the aforementioned processing, at least part of the processing of at least one processing unit may be performed using hardware. In addition, in sentences of the description of this embodiment, the processing unit serving as a subject means that the processor 414 executes the corresponding process in practice. Here, when at least part of the processing unit is implemented using hardware, such hardware may also serve as a subject in the sentence in addition to the processor 414. A computer program such as the DBMS 412 may be installed in the DB server 401, for example, from a program source. The program source may be, for example, a storage medium readable by the DB server 401.

A configuration of the DBMS 412 shown in FIG. 10 is just exemplary. For example, any processing unit may be divided into a plurality of processing units, or one processing unit may be structured by integrating functions of a plurality of processing units.

FIG. 11 shows a configuration of the query execution management table 424.

The query execution management table 424 has information regarding execution thereof in the unit of partial query. The "partial query" is unit of execution capable to independently initiating execution by one task. For example, if the query execution plan includes information representing a plurality of DB operations, the partial query may be one or more DB operation out of a plurality of DB operations or may be part of a certain DB operation out of a plurality of DB operations as long as its operation can be independently initiated by one task. More specifically, in the case of a query including a summing process such as SUM in a subquery, its query execution plan has two partial queries including a partial query for the subquery and the remaining part of the query (other than the subquery). The query execution unit 423 can execute a plurality of partial queries in the query execution plan in parallel. It is noted that each query execution plan of FIGS. 5 and 6 consists of one partial query.

The query execution management table 424 includes information for each partial query, such as Priority 901, Top priority flag 902, Target execution time 903, Execution start timing 904, Execution progress rate 905, Allocated memory resource amount 906, and reserved memory resource amount 907. In addition, the query execution management table 424 also includes information common to a plurality of partial queries, such as unreserved memory resource amount 908 and Total allocatable memory resource amount 909. Various types of information are defined as follows.

(*) Priority 901 indicates a priority for executing the partial query. As a value of Priority 901 is higher, the corresponding partial query has a higher priority. The priority may be specified for the receiving query itself or may be specified by a user separately from the query. The priority may be determined by the DBMS 412 or a user based on an attribute regarding the AP 411 of the query issuing source, an attribute regarding a user who issues the query, and/or a content of the query execution plan.

(*) Top priority flag 902 is a flag representing whether or not the partial query (ON) has a top priority. The top priority flag 902 may be specified for the query itself received by the DBMS 412 or may be manually set by a user outside the DBMS 412 separately from the query. The top priority flag 902 may be set depending on a content of the query execution plan when the query execution plan is generated by the query execution plan creating unit 422 inside the DBMS 412.

(*) Target execution time 903 indicates a target value of the time taken for execution of the partial query. The target execution time 903 may be specified by a user or may be determined by the DBMS 412 (for example, the query execution plan creating unit 423). For example, the query execution plan creating unit 423 may determine, as the target execution time 903, an estimated execution time based on the computation performed when the query execution plan is generated based on a cost computation.

(*) Execution start timing 904 indicates a timing for initiating execution of the partial query.

(*) Execution progress rate 905 indicates where execution of the partial query progresses out of the entire execution processing of the partial query. That is, the execution progress rate 905 indicates a progress of execution of the partial query. For example, the execution progress rate 905 may be a ratio of the number of executed I/Os (number of completed DB operations) against an estimated number of total I/Os (estimated number of DB operations) based on the aforementioned cost computation.

(*) Allocated memory resource amount 906 indicates a memory resource amount allocated to execute the corresponding partial query out of the reserved memory resource amount 907 of the partial query.

(*) Reserved memory resource amount 907 indicates a memory resource amount reserved for execution of the partial query.

(*) Unreserved memory resource amount 908 is a total amount of memory resources not reserved for any partial query out of the allocatable memory resource amount 909.

(*) Total allocatable memory resource amount 909 is a total amount of memory resources allocatable to execution of overall partial queries. A value of the total allocatable memory resource amount 909 corresponds to the upper allocation limit.

The memory resource management unit 425 manages information 906 to 909 regarding memory resources used in execution of a query. The memory resource management unit 425 may register the total allocatable memory resource amount 909 before execution of at least one partial query is initiated. It is noted that the query execution unit 423 may exclusively update the query execution management table 424.

Hereinafter, various processing performed in this embodiment will be described with reference FIGS. 12 to 25.

Figure 12:
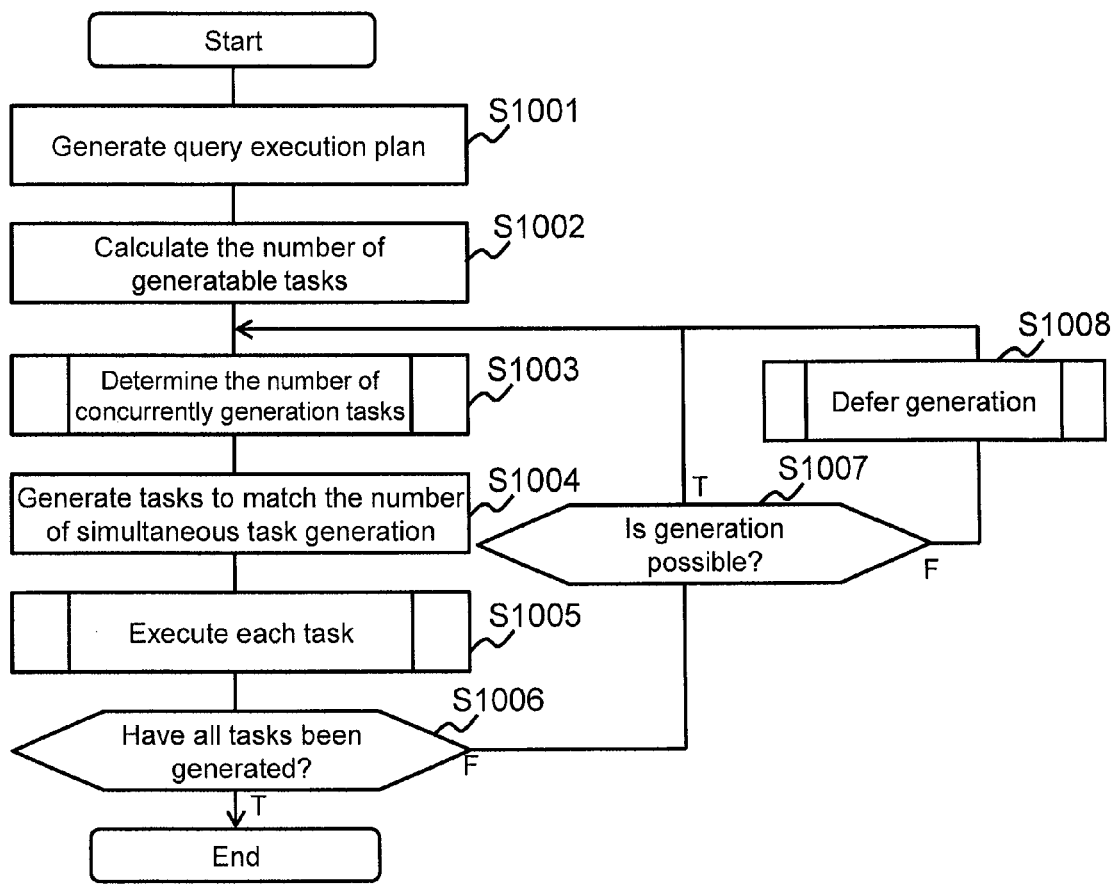
FIG. 12 shows a flow of the entire query execution according to Embodiment 1.

FIG. 12 shows a flow of the entire process of creating and executing a task to execute the query received by the DBMS 412. FIG. 12 shows a flow of execution of one query. It is noted that, when two or more queries are executed simultaneously, the DBMS 412 may perform the process of FIG. 12 for two or more queries in parallel.

In S1001, the query execution plan creating unit 422 generates a query execution plan for a query received by the query receiving unit 421 based on statistic information for the data of the DB 451 (hereinafter, "DB statistical information"). The query execution plan creating unit 422 may perform cost computation for each of one or more candidates of the query execution plan and select one of the candidates of the query execution plan as the query execution plan. The DB statistical information may include, for example, information representing the number of records for each Table 462, information regarding maximum and minimum values of data for each column, or statistic information such as a histogram representing a data distribution status for each column. The DB statistical information is stored in the local storage device 415 or the memory 416. The DB statistical information may be generated by causing the DBMS 412 to check the DB 451 or may be input from the outside of the DBMS 412. In addition, the query execution plan may be generated based on a description of the query as well as the DB statistical information. The query execution plan creating unit 422 may instruct the query execution unit 423 to register the timing of S1001 as the execution start timing 904 of the partial query matching the corresponding query in the query execution management table 424. Furthermore, the query execution plan creating unit 422 may instruct the query execution unit 423 to register the priority 901 of the partial query matching the corresponding query, the top priority flag 902, and the target execution time 903 in the query execution management table 424 based on the generated query execution plan.

In S1002, the query execution unit 423 calculates the number of generatable tasks which is the number of tasks that can be newly generated based on the query execution plan generated in S1001. For example, the query execution unit 423 determines the number of partial queries that can be executed by a plurality of tasks in parallel based on the query execution plan and calculates the determined number of partial queries as the number of generatable tasks.

Figure 15:
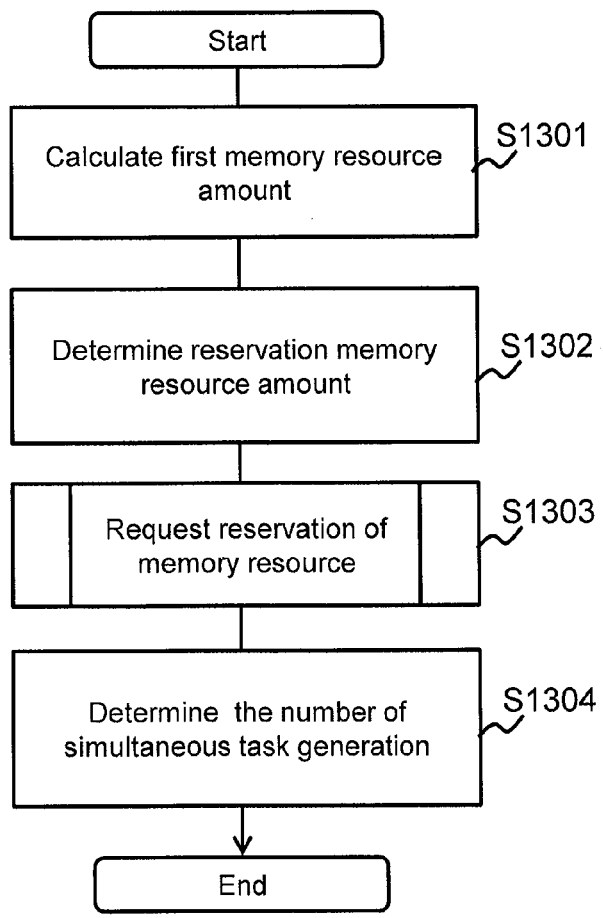
FIG. 15 shows a flow of a determination processing of simultaneous-task-generation number according to Embodiment 1.

In S1003, the query execution unit 423 (simultaneous-task-generation number determination unit 431) performs the determination processing of simultaneous-task-generation number for determining the number of simultaneous task generation. The determination processing of simultaneous-task-generation number is shown in FIG. 15 in detail. Referring to FIG. 15, the query execution unit 423 reserves memory resources allocated to each of the tasks to match the number of simultaneous task generation through the determination processing of simultaneous-task-generation number.

In S1004, the query execution unit 423 requests the execution task management unit 426 to generate tasks with the same number as the number of simultaneous task generation determined in S1003. The execution task management unit 426 generates tasks to match the requested number. It is noted that, when the number of generated tasks is smaller than the number of simultaneous task generation, the query execution unit 423 may cancel the reservation of the memory resource for the task not generated within the number of simultaneous task generation out of the memory resources reserved in S1003.

Figure 13:
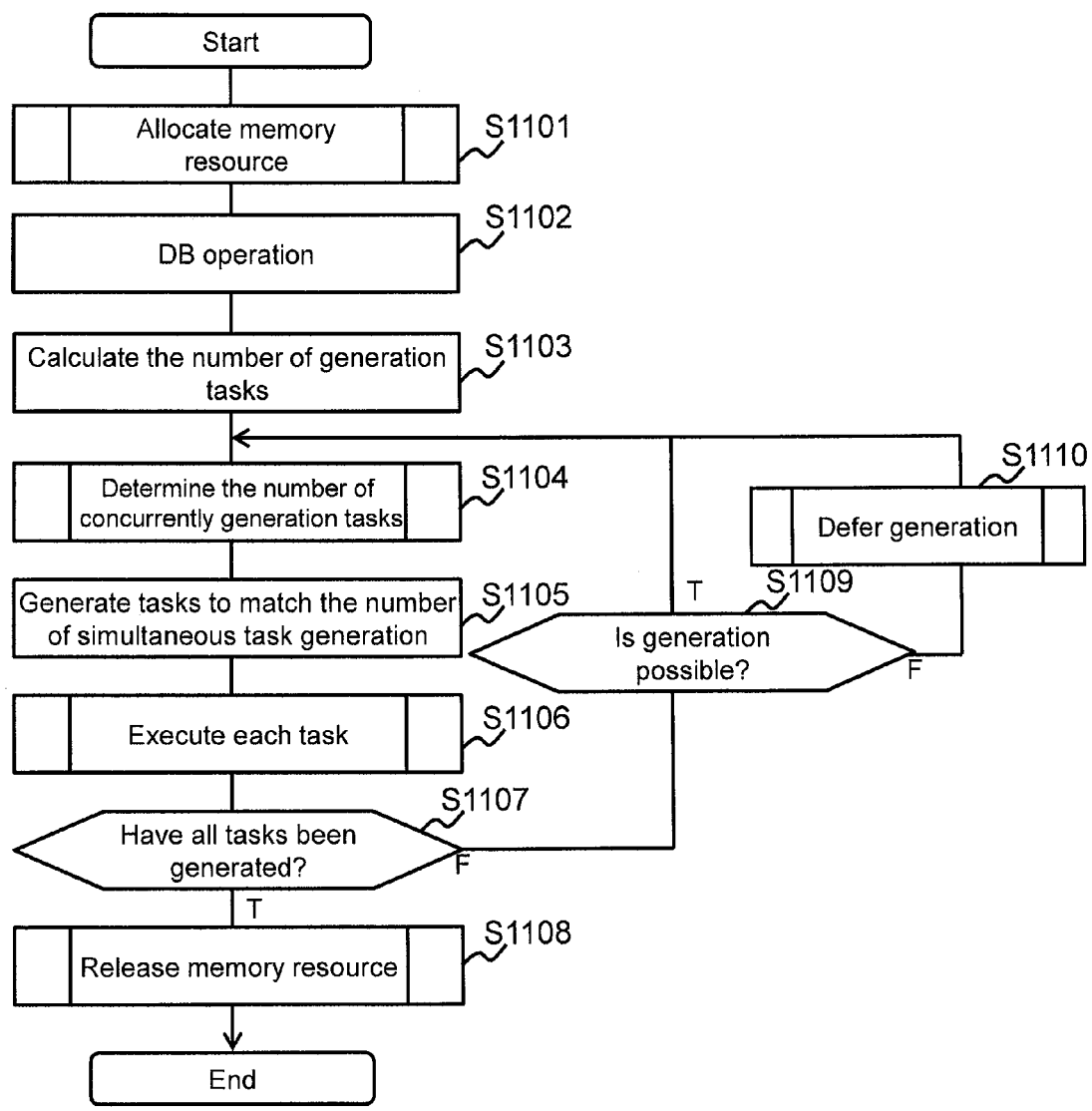
FIG. 13 shows a flow of a task execution processing according to Embodiment 1.

In S1005, the query execution unit 423 performs a process of executing each task generated in S1004 (task execution processing). The executed task execution processing is shown in FIG. 13 in detail. It is noted that the query execution unit 423 performs no process in S1004 and S1005 when the number of simultaneous task generation determined in S1003 is zero.

In S1006, the query execution unit 423 determines whether or not all of the tasks are generated to match the number of generatable tasks calculated in S1002. If it is determined YES, the query execution unit 423 terminates the process. If it is determined NO, the query execution unit 423 performs S1007. It is noted that the query execution unit 423 generates a result of query execution by extending the process for the task executed in S1005.

In S1007, the query execution unit 423 determines whether or not a new task can be generated. For example, the query execution unit 423 inquires, of the execution task management unit 426, whether or not a new task can be generated. The execution task management unit 426 replies the inquiry, for example, depending on a status of allocation of the memory resources managed to generate tasks. In addition, the query execution unit 423 determines whether or not the unreserved memory resource amount 908 exceeds the memory resource amount necessary in the DB operation corresponding to a new task, for example, by referencing the query execution management table 424. The query execution unit 423 determines whether or not a new task can be generated based on the result of the determination and the reply from the execution task management unit 426. If it is determined YES in S1007, the query execution unit 423 performs S1003 again. If it is determined NO in S1007, the query execution unit 423 performs S1008.

Figure 14:
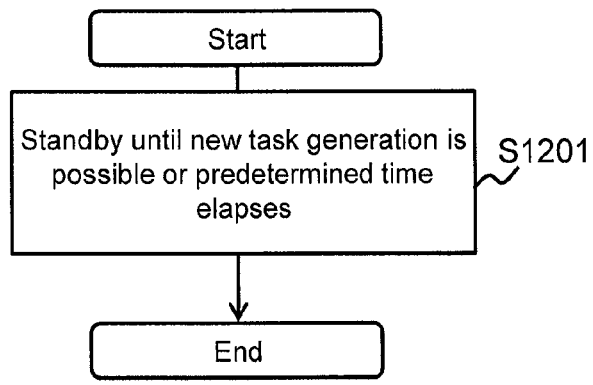
FIG. 14 shows a flow of a task generation deferring processing according to Embodiment 1.

In S1008, the query execution unit 423 performs the task generation deferring processing. The task generation deferring processing is shown in FIG. 14 in detail.

FIG. 13 shows a flow of the task execution processing (S1005 of FIG. 12 and S1106 of FIG. 13). FIG. 13 shows a flow of an exemplary single parent task (referred to as a "target parent task" in the description for FIG. 13). In addition, in the description for FIG. 13, the "parent task" refers to an arbitrary single task. A task generated based on the parent task will be referred to as a "child task." If another task is generated from the child task by the query execution unit 423, the child task serves as a parent task, and the task newly generated serves as a child task.

In S1101, the query execution unit 423 (memory resource management unit 425) performs a memory resource allocation processing for the object parent task. The memory resource allocation processing is shown in detail in FIG. 16.

In S1102, the query execution unit 423 sets information for executing the DB operation corresponding to the object parent task (such as a data access destination necessary in the DB operation and fetched data necessary to generate the result) in the memory resource allocated to the object parent task. In addition, the query execution unit 423 executes the DB operation corresponding to the object parent task. Information for executing the DB operation corresponding to the object parent task is set based on the information of the task as a source of creating the object parent task. The query execution unit 423 executes the object parent task to issue a request for reading data from the DB 451 and executes the DB operation for the read data. It is noted that, when S1102 is terminated, the query execution unit 423 may update the execution progress rate 905 (one of the values on the query execution management table 424) corresponding to the executed partial query.

In S1103, the query execution unit 423 calculates the number of generatable tasks, which is the number of child tasks that can be newly generated, in order to perform the next DB operation on the query execution plan based on the result of execution of the DB operation executed in S1102. For example, it is assumed that, in S1102, the query execution unit 423 executes the DB operation for searching RowID List "a1" of Index A in FIG. 1 through the object parent task. In this case, the query execution unit 423 determines the number of child tasks that can be newly generated as "2" to fetch each data of the first and third records of Table A (for the next DB operation on the query execution plan of FIG. 5) based on the result of this execution and performs computation by setting this value to the number of generatable tasks. It is noted that, if the DB operation corresponding to the object parent task is generation of the result of the query execution and the like, and there is no next DB operation, the query execution unit 423 calculates the number of generatable tasks as "zero." If the number of generatable tasks is calculated as "zero," the query execution unit 423 performs S1108 without performing anything in S1104, S1105, S1106, and S1107.

In S1104, the query execution unit 423 (the simultaneous-task-generation number determination unit 431) performs the determination processing of simultaneous-task-generation number. The determination processing of simultaneous-task-generation number is shown in detail in FIG. 15. Referring to FIG. 15, the query execution unit 423 reserves memory resources for allocation to each task to match the number of simultaneous task generation through the determination processing of simultaneous-task-generation number.

In S1105, the query execution unit 423 requests the execution task management unit 426 to generate child tasks with the same number as the number of simultaneous task generation determined in S1104. The execution task management unit 426 generates tasks to match the requested number. It is noted that, if the number of the generated child tasks is smaller than the number of simultaneous task generation, the query execution unit 423 may cancel reservation of memory resources for the tasks that are not generated within the number of simultaneous task generation out of the memory resources reserved in S1104.

In S1106, the query execution unit 423 performs a task execution processing (process of FIG. 13) to match the next DB operation for each child task generated in S1105 based on the result of execution of the DB operation of S1102.

In S1107, the query execution unit 423 determines whether or not all of the child tasks matching the number of generatable tasks calculated in S1103 are generated. If it is determined YES, the query execution unit 423 performs S1108. If it is determined NO, the query execution unit 423 performs S1109.

In S1108, the query execution unit 423 (memory resource management unit 425) performs a memory resource release processing for releasing a memory resource that can be released to the executed object parent task. The memory resource release processing is shown in detail in FIG. 17. After S1108, the query execution unit 423 instructs the execution task management unit 426 to terminate the object parent task.

In S1109, the query execution unit 423 determines whether or not a new child task can be generated. This process is similar to S1007. If it is determined YES in S1109, the query execution unit 423 performs S1104 again. If it is determined NO in S1109, the query execution unit 423 performs S1110.

In S1110, the query execution unit 423 performs a task generation deferring processing. The task generation deferring processing is shown in detail in FIG. 14.

FIG. 14 shows a flow of the task generation deferring processing (S1108 of FIG. 12 and S1110 of FIG. 13). FIG. 14 shows a flow of one exemplary task.

In S1201, the query execution unit 423 waits until a new task can be generated or until a predetermined time elapses. A processing of determining "whether or not a new task can be generated" is similar to S1007. In S1201, the query execution unit 423 repeats the process such as S1007 with a predetermined time interval, for example, until a new task can be generated. It is conceived that a new task can be generated in the task generation deferring processing when the following event is generated:

(x) for the partial query under execution, the memory resource amount allocatable to execution of the corresponding partial query increases as the priority 901 is raised, or the top priority flag 902 is asserted; and (y) the unreserved memory resource amount 908 or the total allocatable memory resource amount 909 increases.

It is noted that, in S1201, the query execution unit 423 may terminate execution of the query including the partial query with an error when a predetermined time elapses from the execution start timing 904 corresponding to the partial query under execution by referencing the query execution management table 424. In order to terminate execution of the query with an error, the query execution unit 423 releases the memory resource relating to execution of the corresponding query and cancels reservation to terminate the relating task.

FIG. 15 shows a flow of the determination processing of simultaneous-task-generation number (S1003 of FIG. 12 and S1104 of FIG. 13).

In S1301, the simultaneous-task-generation number determination unit 431 calculates a first memory resource amount, which is the amount of memory resources necessary to be allocated to a task newly generated, based on the memory resource amount necessary in the DB operation corresponding to the task newly generated, which is information included in the query execution plan. It is noted that, when a part of the memory resources necessary in the DB operation is shared with a plurality of tasks including the task newly generated, the simultaneous-task-generation number determination unit 431 may calculate the first memory resource amount such that the amount of the shared memory resources is not repeatedly counted between tasks.

In S1302, the simultaneous-task-generation number determination unit 431 determines a reservation memory resource amount, which is the amount of memory resources reserved for allocation to the task newly generated based on the first memory resource amount calculated in S1301 and the number of generatable tasks calculated in the immediately previous step (S1002 of FIG. 12 or S1103 of FIG. 13) of the determination processing of simultaneous-task-generation number. The reservation memory resource amount may be calculated, for example, as a product between the first memory resource amount and the number of generatable tasks.

In S1303, the simultaneous-task-generation number determination unit 431 requests the memory resource management unit 425 to reserve memory resources to match the reservation memory resource amount determined in S1302. The memory resource management unit 425 receives the request, performs the memory resource reservation processing of FIG. 18, and notifies the simultaneous-task-generation number determination unit 431 of the amount of successfully reserved memory resources. The amount of successfully reserved memory resources may be an integer multiple of the first memory resource amount.

In S1304, the simultaneous-task-generation number determination unit 431 determines the number of simultaneous task generation based on the memory resource amount successfully reserved in S1303 and the first memory resource amount calculated in S1301. The number of simultaneous task generation may be set to, for example, a value obtained by subtracting the memory resource amount successfully reserved in S1303 from the first memory resource amount. If there is an overflow of the memory resources, the simultaneous-task-generation number determination unit 431 may request the memory resource management unit 425 to cancel the reservation for the overflowing memory resource amount.

Figure 16:
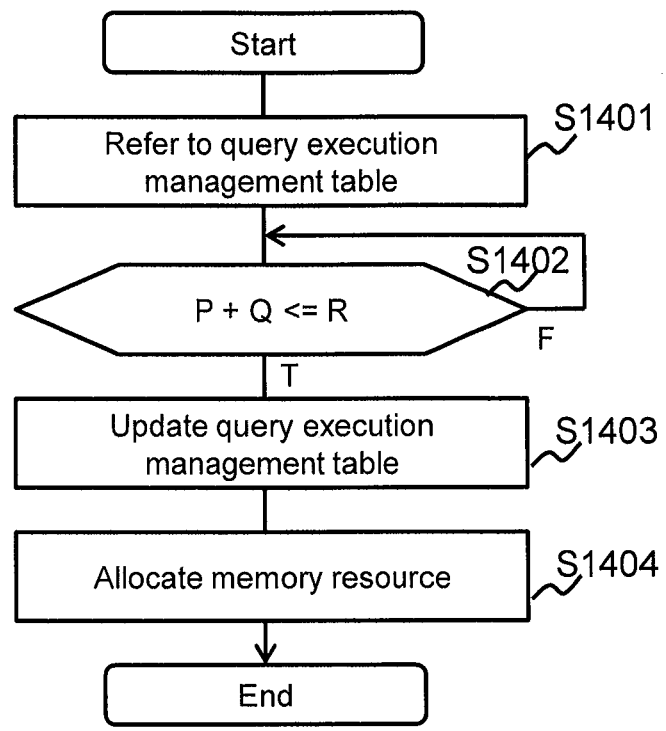
FIG. 16 shows a flow of a memory resource allocation processing according to Embodiment 1.

FIG. 16 shows a flow of the memory resource allocation processing (S1101 of FIG. 13). FIG. 16 shows a flow of one exemplary task (referred to as an "object task" in the description for FIG. 16). It is noted that, in the description for FIG. 16, a partial query executed by the object task will be referred to as an "object partial query."

In S1401, the memory resource management unit 425 obtains information regarding an object partial query by referencing the query execution management table 424.

In S1402, the memory resource management unit 425 determines whether or not "P+Q" is equal to or smaller than "R." The factors P, Q, and R are defined as follows. In the following description, a new allocation memory resource amount Q may be estimated from the first memory resource amount (the value calculated in S1301 of FIG. 15) based on the query execution plan. However, this estimation is not necessarily perfect. The new allocation memory resource amount Q used in execution of the object task in practice may be different from the estimated memory resource amount, that is, the memory resource amount reserved in S1303 of FIG. 15.

P=allocated memory resource amount 906 corresponding to object partial query.
Q=new allocation memory resource amount necessary to execute object task.
R=reserved memory resource amount 907 corresponding to object partial query.

If it is determined NO in S1402 (S1402: F), the memory resource management unit 425 waits until any one of the following events (1) to (3) corresponding to the object partial query is detected:

(1) the allocated memory resource amount 906 decreases;
(2) the reserved memory resource amount 907 increases; and
(3) a predetermined time elapses.

When any one of the events is detected, the memory resource management unit 425 may perform S1402 again. If it is determined YES in S1402 (S1402: T), the memory resource management unit 425 performs S1403.

In S1403, the memory resource management unit 425 updates the query execution management table 424. For example, the new allocation memory resource amount of S1402 is added to the allocated memory resource amount 906 corresponding to the object partial query.

In S1404, the memory resource management unit 425 allocates the memory resources matching the new allocation memory resource amount out of the reserved memory resources to the object task.

Figure 17:
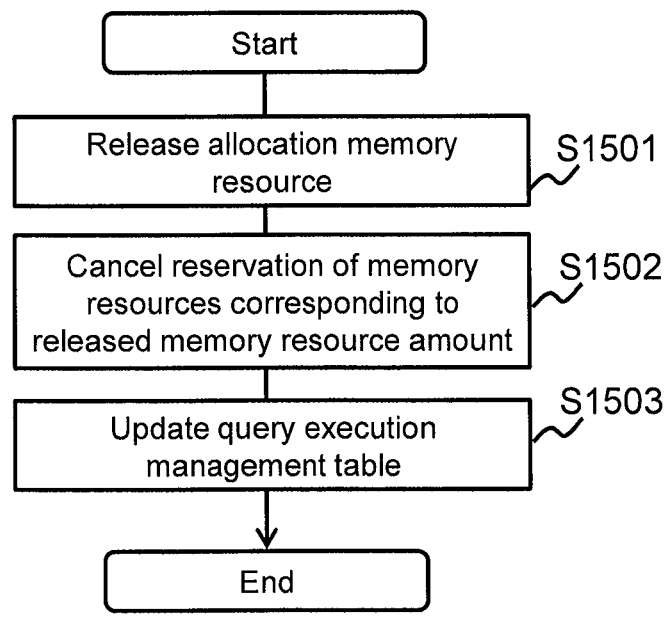
FIG. 17 shows a flow of a memory resource release processing according to Embodiment 1.

FIG. 17 shows a flow of the memory resource release processing (S1108 of FIG. 13). FIG. 17 shows a flow of one exemplary task (referred to as an "object task" in the description for FIG. 17). It is noted that, in the description for FIG. 17, the partial query executed by the object task will be referred to as an "object partial query."

In S1501, the memory resource management unit 425 releases the memory resource allocated to the object task. It is noted that the memory resource management unit 425 does not release the memory resources shared between the object task and other tasks out of the memory resources allocated to the object task.

In S1502, the memory resource management unit 425 cancels reservation of the memory resources corresponding to the memory resource amount released in S1501.

In S1503, the memory resource management unit 425 updates information of the query execution management table 424 corresponding to the object partial query. For example, the memory resource management unit 425 subtracts the amount of memory resources released in S1501 from the allocated memory resource amount 906 and the reserved memory resource amount 907 corresponding to the object partial query and adds the resulting memory resource amount to the unreserved memory resource amount 908.

Figure 18:
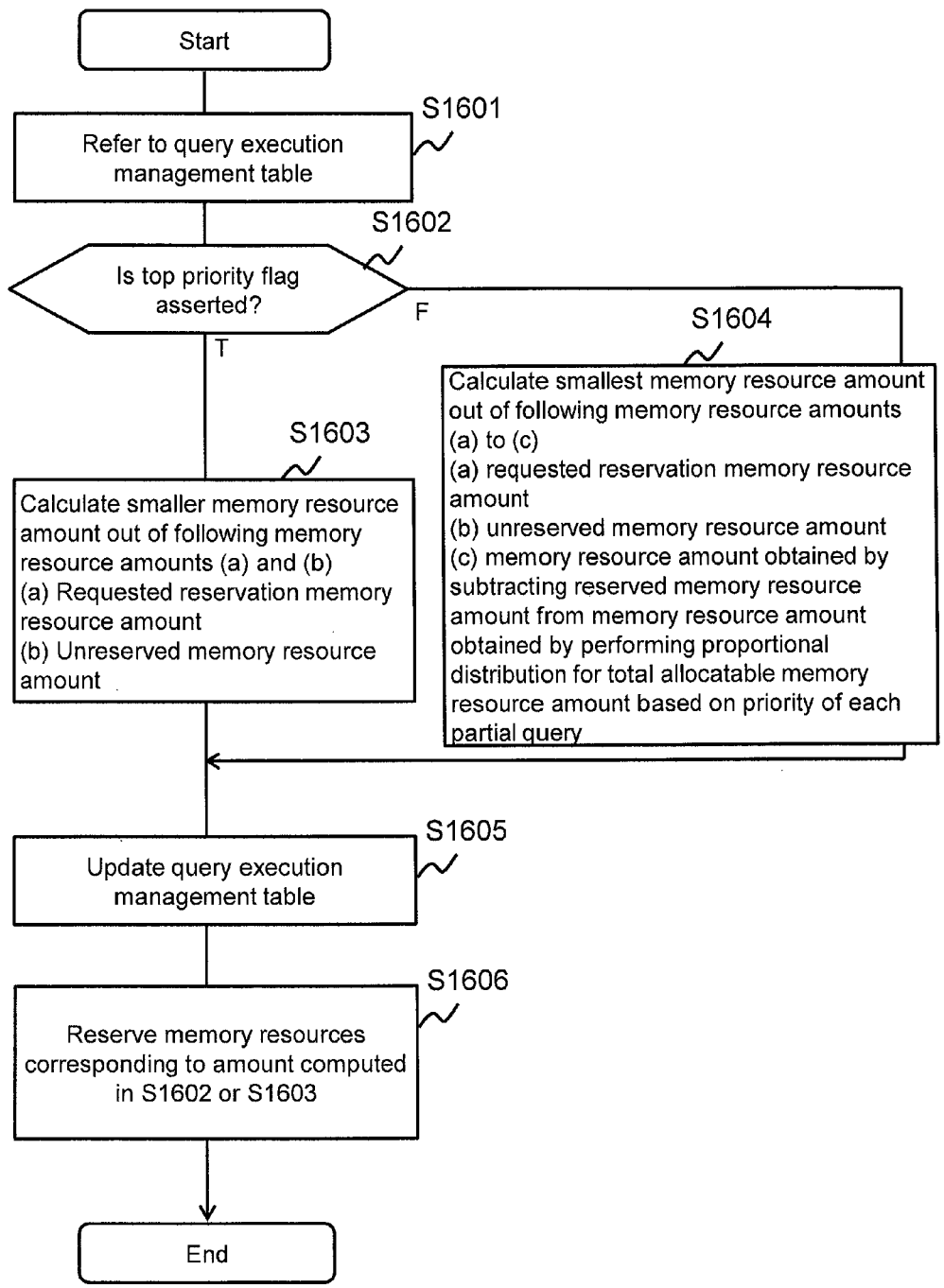
FIG. 18 shows a flow of a memory resource reservation processing according to Embodiment 1.

FIG. 18 shows a flow of the memory resource reservation processing (S1303 of FIG. 15). FIG. 18 shows a flow of one exemplary task (referred to as an "object task" in the description for FIG. 18). It is noted that, in the description for FIG. 18, a partial query relating to the object task will be referred to as an "object partial query."

In S1601, the memory resource management unit 425 obtains information of the object partial query by referencing the query execution management table 424.

In S1602, the memory resource management unit 425 determines whether or not the top priority flag 902 corresponding to the object partial query is asserted.

If it is determined YES in S1602 (S1602: T), the memory resource management unit 425 calculates the smaller of the following memory resource amounts (a) and (b) in S1603:
(a) the requested reservation memory resource amount, and
(b) the unreserved memory resource amount 908.

If it is determined NO in S1602 (S1602: F), the memory resource management unit 425 calculates a minimum value of the following memory resource amounts (a) to (c) in S1604:
(a) the requested reservation memory resource amount,
(b) the unreserved memory resource amount 908, and
(c) the memory resource amount obtained by subtracting the reserved memory resource amount 907 corresponding to the object partial query from upper limit of the memory resource amount allocatable to execution of the object partial query.

It is noted that (c) "the upper limit of the memory resource amount allocatable to execution of the object partial query" is a value corresponding to the object partial query, out of values obtained by distributing (for example, proportional distribution) the total allocable memory resource amount 909 to each of the partial queries based on the priorities 901 of each partial queries under execution. For example, as shown in FIG. 11, it is assumed that the total allocatable memory resource amount 909 is set to "100 MB," and the priorities of the partial queries 1 to 3 are set to "3," "2," and "5," respectively. In addition, it is assumed that the total allocatable memory resource amount 909 is proportionally distributed based on the priorities 901 of each partial query. In this case, the upper limit of the memory resource amount allocatable to execution of each partial query is set to "30 MB" for the partial query 1, "20 MB" for the partial query 2, and "50 MB" to the partial query 3.

For example, when the number partial queries executed simultaneously increases, or when a partial query having an asserted top priority flag 902 is executed, the memory resource amount of the (c) may become a negative value. In this case, the memory resource management unit 425 sets the memory resource amount calculated in S1604 to zero.

In S1605, the memory resource management unit 425 updates the query execution management table 424. For example, the memory resource management unit 425 adds the memory resource amount calculated in S1603 or S1604 to the reserved memory resource amount 907 corresponding to the object partial query. Furthermore, the memory resource management unit 425 subtracts the memory resource amount calculated in S1603 or S1604 from the unreserved memory resource amount 908.

In S1606, the memory resource management unit 425 reserves memory resources matching the amount calculated in S1603 or S1604 out of the unreserved ones of the memory resources allocatable to query execution.

Figure 19:
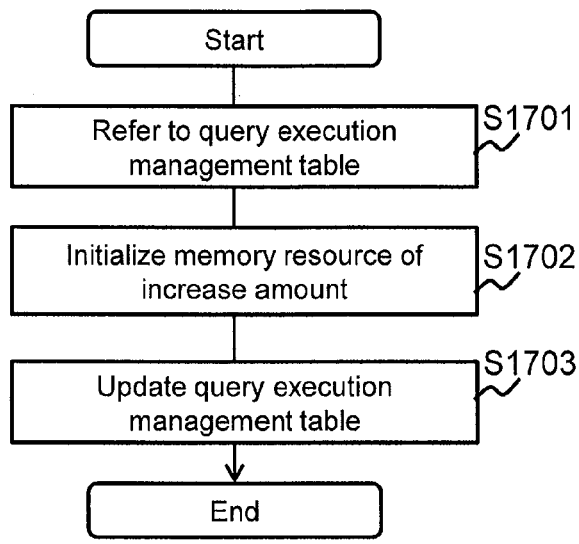
FIG. 19 shows a flow of a memory resource increase processing according to Embodiment 1.

A total amount of the memory resources allocatable to execution of the query described in this embodiment may change depending on various factors. For example, inside the DBMS 412, the total amount of the memory resources may change depending on a change of the memory resource amount (for a task for executing a query) managed by the execution task management unit 426 or a change of the memory resource amount (for the DB buffer) managed by the DB buffer management unit 427. For example, outside the DBMS 412, the total amount of the memory resources may change depending on a use status of memory resources of another computer program executed on the same memory 416, an increase or decrease of a capacity of the memory 416, or a change of a total memory resource amount of a virtual machine when the DB server 401 is a virtual machine. In particular, as a computer resource is virtualized under a cloud environment recently commercialized, the total memory resource amount allocatable to query execution may change depending on a situation. FIG. 19 shows a flow of the memory resource increase processing.

The memory resource increase processing is a process for increasing the total allocatable memory resource amount 909 which is a total amount of the memory resources allocatable to query execution. This process may start when the factor of increasing the memory resource amount described above is generated.

In S1701, the memory resource management unit 425 references the query execution management table 424.

In S1702, the memory resource management unit 425 initializes a memory resource corresponding to the increasing amount from the total allocatable memory resource amount 909 and manages the increased memory resource as an unreserved memory resource.

In S1703, the memory resource management unit 425 updates the query execution management table 424. For example, the memory resource management unit 425 adds the memory resource amount increased in S1702 to the unreserved memory resource amount 908 and the total allocatable memory resource amount 909.

Figure 20:
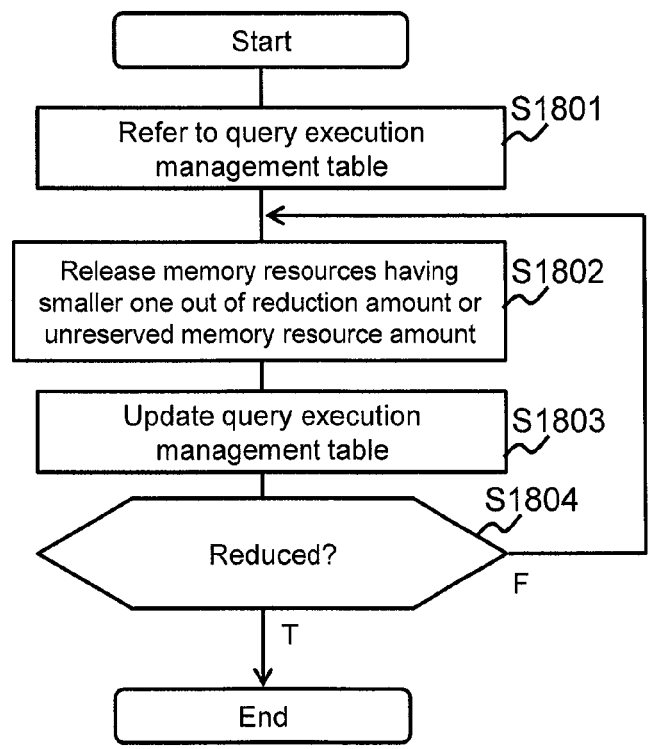
FIG. 20 shows a flow of a memory resource decrease processing according to Embodiment 1.

FIG. 20 shows a flow of a memory resource decrease processing.

The memory resource decrease processing is a process for decreasing the total allocatable memory resource amount 909. This process may start when the factor of decreasing the memory resource amount described above is generated.

In S1801, the memory resource management unit 425 references the query execution management table 424.

In S1802, the memory resource management unit 425 determines the smaller of the unreserved memory resource amount 908 and a decreasing amount from the total allocatable memory resource amount 909. The memory resource management unit 425 releases memory resources corresponding to the determined amount out of the unreserved ones of the memory resources allocatable to query execution.

In S1803, the memory resource management unit 425 updates the query execution management table 424. For example, the memory resource management unit 425 subtracts the amount of memory resources released in S1802 from the unreserved memory resource amount 908 and the total allocatable memory resource amount 909.

In S1804, the memory resource management unit 425 determines whether or not, the memory resources corresponding to the amount decreased from the total allocatable memory resource amount 909 are released. If it is determined YES, the memory resource management unit 425 terminates the process. On the other hand, if it is determined NO, the memory resource management unit 425 performs S1802 again. It is determined NO when the memory resource management unit 425 releases the memory resources corresponding to the unreserved memory resource amount 908 in S1802. That is, this is the case where the amount of memory resources released in S1802 is smaller than the amount decreasing from the total allocatable memory resource amount 909. In this case, the memory resource management unit 425 performs S1802 again and releases the memory resources corresponding to a difference between the amount decreasing from the total allocatable memory resource amount 909 and the amount of memory resources released in S1802.

Figure 21:
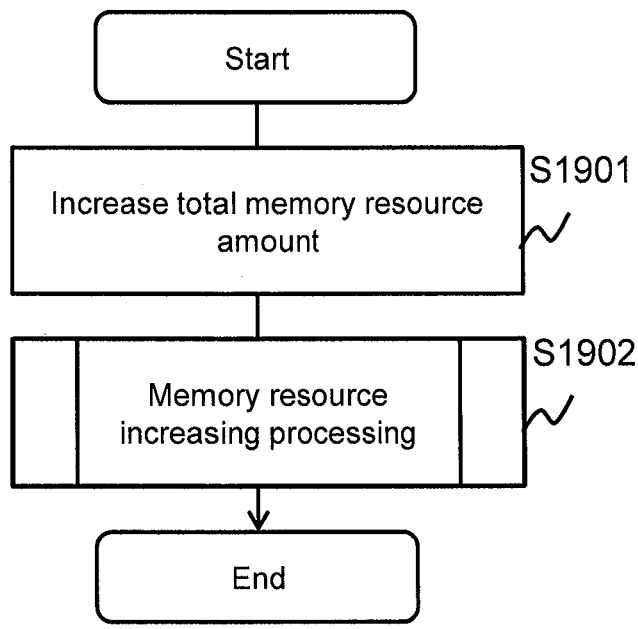
FIG. 21 shows a flow of a server memory resource increase processing according to Embodiment 1.

FIG. 21 shows a flow of the server memory resource increase processing. The server memory resource increase processing is a process of increasing a total memory resource amount recognized by the OS 415, for example, when the memory 416 of the DB server 401 is extended, or when the DB server 401 is a virtual machine, and a total memory resource amount of the virtual machine increases.

In S1901, the OS 415 increases the total memory resource amount. For example, it is assumed that an administrator of the DB server 401 extends the memory 416 of the DB server 401. Alternatively, if the DB server 401 is a virtual machine, it is assumed that a total memory resource amount of the virtual machine increases. In these cases, the OS 415 recognizes an increase of the total memory resource amount corresponding to the extended or increasing amount.

In S1902, the memory resource management unit 425 of the DBMS 412 performs the memory resource increase processing of FIG. 19 for the memory resource amount increased in S1901. It is noted that the DBMS 412 may increase the amount of memory resources used in the DBMS 412 such as memory resources managed by the execution task management unit 426 or memory resources managed by the DB buffer management unit 427.

Figure 22:
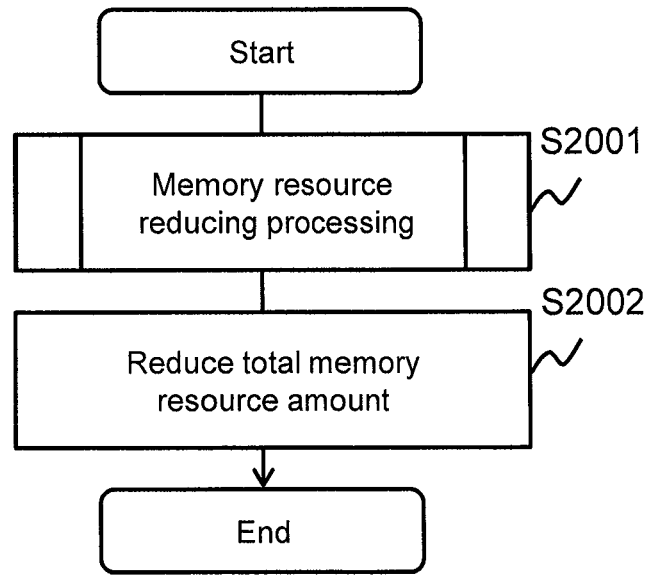
FIG. 22 shows a flow of a server memory resource decrease processing according to Embodiment 1.

FIG. 22 shows a flow of a server memory resource decrease processing. The server memory resource decrease processing is a process for decreasing the total memory resource amount recognized by the OS 415, for example, when the memory 416 of the DB server 401 is reduced, or when the DB server 401 is a virtual machine, and the total memory resource amount of the virtual machine decreases.

In S2001, the memory resource management unit 425 in the DBMS 412 performs the memory resource distribution process of FIG. 20 for the decreasing memory resource amount. It is noted that the DBMS 412 may reduce the amount of memory resources used in the DBMS 412 such as the memory resources managed by the execution task management unit 426 or the memory resources managed by the DB buffer management unit 427.

In S2002, the OS 415 reduces the total memory resource amount. For example, it is assumed that an administrator of the DB server 401 reduces the memory 416 corresponding to the amount of memory resources decreased in S2001. Alternatively, when the DB server 401 is a virtual machine, it is assumed that the total memory resource amount of the virtual machine decreases as many as the memory resource amount decreased in S2001. In these cases, the OS 415 recognizes a decrease of the total memory resource amount corresponding to the amount of the reduction or the decrease.

Figure 23:
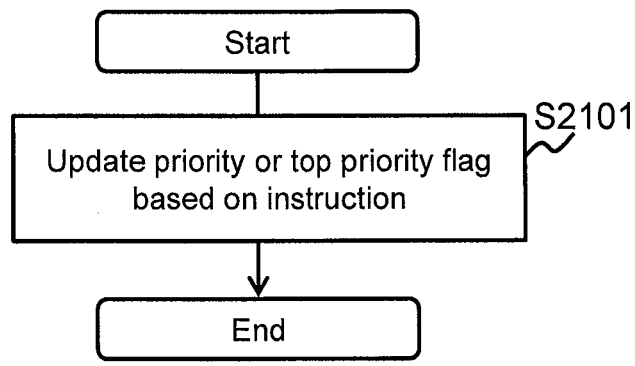
FIG. 23 shows a flow of a manual priority change processing according to Embodiment 1.

FIG. 23 shows a flow of a manual priority change processing. Hereinafter, an example of one partial query (referred to as a "object partial query" in the description for FIG. 23) will be described.

In S2101, the query receiving unit 421 receives a priority change instruction for the object partial query and instructs the query execution unit 423 to change a priority of the object partial query. An issuance source of the priority change instruction may be the same as or different from a query issuing source for the object partial query. The query execution unit 423 receives this instruction and changes a priority 901 or a top priority flag 902 corresponding to the object partial query of the query execution management table 424 depending on a content of this instruction.

Figure 24:
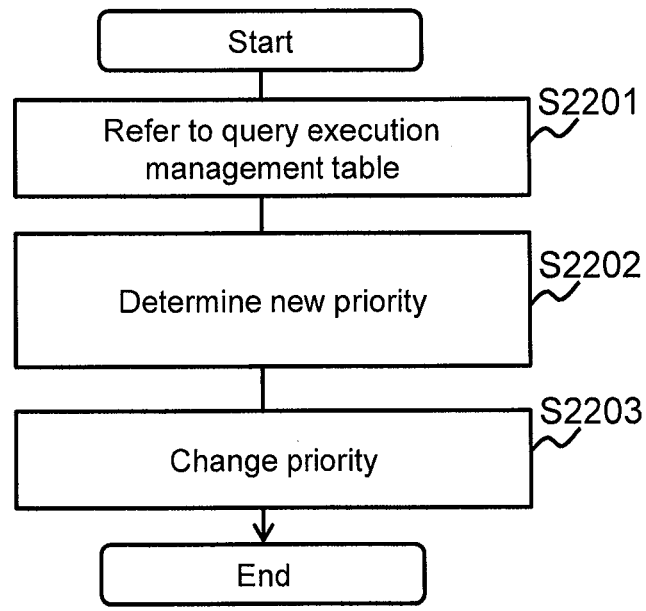
FIG. 24 shows a flow of an automatic priority change processing according to Embodiment 1.

FIG. 24 shows a flow of the automatic priority change processing. Hereinafter, an example of one partial query (referred to as a "change object partial query" in the description for FIG. 23) which is a priority change target will be described. A priority change object partial query is, for example, a partial query specified to automatically change a priority. It is noted that the automatic priority change processing may be performed for each priority change object partial query. In addition, the automatic priority change processing may be performed, for example, with a certain time interval.

In S2201, the query execution unit 423 obtains information of the change object partial query by referencing the query execution management table 424.

In S2202, the query execution unit 423 determines a new priority corresponding to the change object partial query based on at least one of the target execution time 903 corresponding to the change object partial query, the elapsed execution time (value obtained by subtracting the execution start timing 904 from the current time), and the execution progress rate 905.

In S2203, the query execution unit 423 changes the priority 901 corresponding to the change object partial query in the query execution management table 424 into the priority determined in S2202.

It is noted that the query execution unit 423 may determine the priority of the change object partial query using at least one of the following methods (1) to (3):
(1) When the elapsed time approaches the target execution time 903 at a predetermined ratio, the priority is incremented by "1" from the previous value.
(2) When the elapsed time elapses from the target execution time 903 at a predetermined ratio, the priority is incremented by "1" from the previous value.
(3) When the execution progress rate 905 is equal to or higher than a predetermined rate, and the elapsed time is shorter than the target execution time 903 at a predetermined rate, the priority is decremented by "1" from the previous value.

Figure 25:
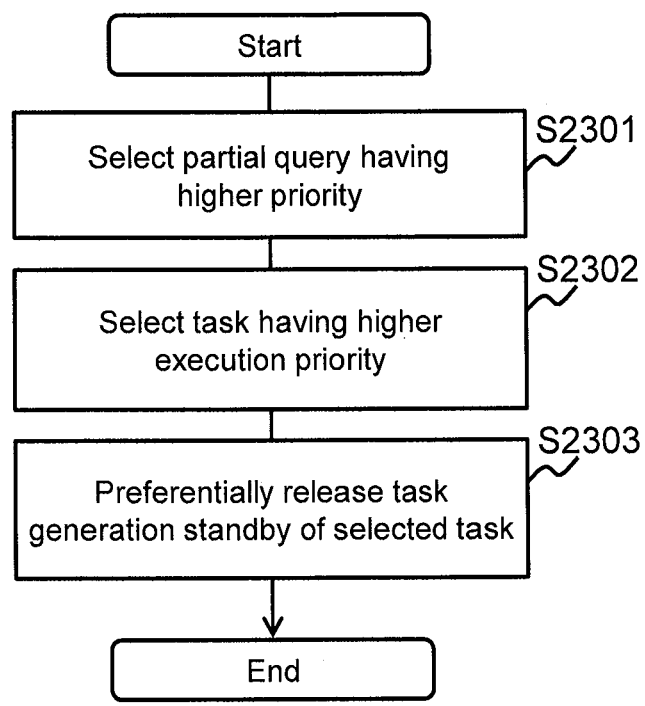
FIG. 25 shows a flow of an additional task generation processing according to Embodiment 1.

FIG. 25 shows a flow of an additional task generation processing.

The additional task generation processing is a process initiated, for example, when the following event (1) or (2) is generated.
(1) The total allocatable memory resource amount 909 or the unreserved memory resource amount 908 of the query execution management table 424 increases.
(2) The priority 901 of a certain partial query of the query execution management table 424 changes, or the top priority flag 902 is asserted. It is noted that the additional task generation processing may be repeated until a task that defers generation of a task does not exist for overall partial queries of the query execution management table 424 when the unreserved memory resource amount 908 of the query execution management table 424 is equal to or larger than a predetermined value.

In S2301, the query execution unit 423 selects a partial query having a top priority 901 out of partial queries having a task that defers generation of a task (S1008 of FIG. 12 or S1110 of FIG. 13) by referencing the query execution management table 424.

In S2302, the query execution unit 423 selects a task having a top execution priority out of tasks waiting for generation of a task in the partial query selected in S2301. For example, the query execution unit 423 selects a task having the smallest number of DB operations subsequent to the DB operation corresponding to the task.

In S2303, the query execution unit 423 first releases a task generation waiting state for the task selected in S2302.

[Embodiment 2]

Hereinafter, Embodiment 2 will be described, in which a description will focus on differences from Embodiment 1, and a description for the same elements as those of Embodiment 1 will be omitted or simplified. Similarly, in Embodiment 2, the DBMS 412 performs a determination processing of simultaneous-task-generation number whenever a new task is generated. In Embodiment 2, the DBMS 412 calculates a first memory resource amount, which is a memory resource amount to be allocated to each of the tasks newly generated, based on a memory resource amount corresponding to the tasks newly generated necessary in the subsequent DB operations until result generation in the determination processing of simultaneous-task-generation number (In Embodiment 1, the first memory resource amount is based on the memory resource amount necessary in one DB operation corresponding to the task newly generated). That is, the DBMS 412 executes the task newly generated by matching the subsequent DB operations until result generation. As a result, it is possible to execute, by one task, the subsequent DB operations until result generation corresponding to that task without performing interrupted memory resource allocation. It is noted that "result generation" is a processing defined based on the query execution plan and typically means generation of a result returned to the query issuing source. However, without limiting thereto, for example, the result generation may be, for example, generation of an intermediate result for each partial query included in the query execution plan. The "subsequent DB operations until result generation" means a series of DB operations from a DB operation starting to be executed by a task newly generated until result generation subsequent to this DB operation.

Further, in Embodiment 2, the DBMS 412 generates a context having information necessary to execute a task newly generated whenever a task is newly generated. The context includes, for example, first information regarding which of one or more DB operations, which is information included in the query execution plan, corresponds to a DB operation starting execution for a task newly generated, second information regarding a data access destination necessary in the DB operation indicated by the first information, and third information regarding fetched data necessary to generate a result. The DBMS 412 generates and executes a new task based on the generated context. In Embodiment 2, a task that defers generation of a task does not occur by creating the context.

Figure 26:
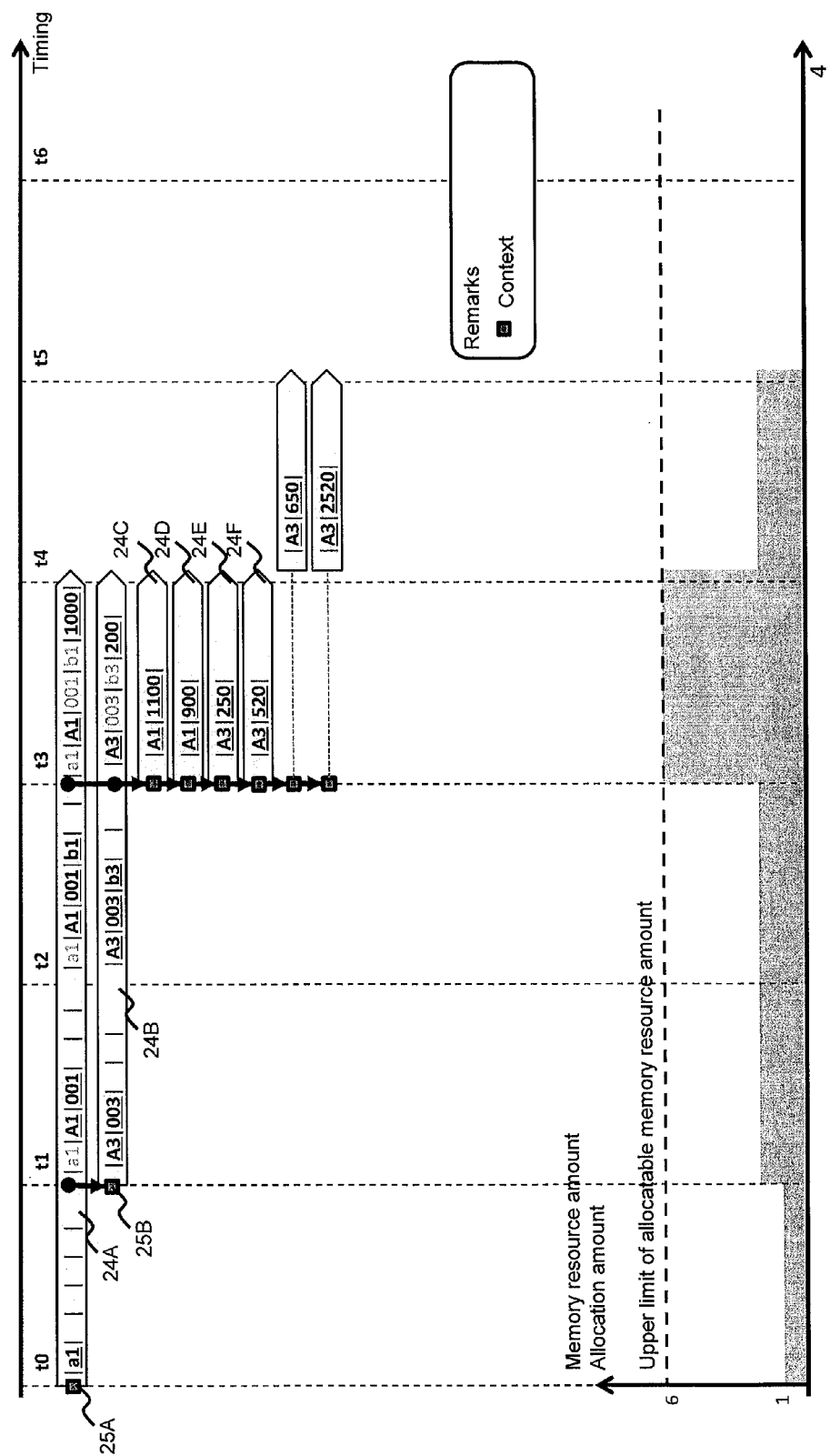
FIG. 26 is an exemplary schematic diagram showing how to avoid exhaustion of memory resources in execution of Query 1 in Embodiment 2.

FIG. 26 is an exemplary schematic diagram showing how to avoid exhaustion of memory resources when the DBMS 412 execute Query1 of FIG. 3 according to the query execution plan of FIG. 5 in Embodiment 2. A description rule is basically similar to that of FIG. 7, and the following rules are added.

(*) A long pentagonal box in the upper half of the drawing means subsequent DB operations until result generation, corresponding to one task.

(*) In character strings inside the pentagonal box, each field partitioned by a vertical line "|" inside unit time (such as t0 to t1 or t1 to t2) corresponds to a memory resource necessary in the subsequent DB operations until result generation corresponding to the task. Data fetched by executing a task after unit time as time elapses for execution of the task, or fetched data necessary to generate the result is input to each field corresponding to a memory resource. That is, this means that the memory resource necessary in the subsequent DB operations until result generation, corresponding to one task, is allocated when a task is generated. In addition, this means that data is input to that memory resource as time elapses.

(*) Out of the character strings inside the pentagonal box, the underlined and bold character strings are data necessary in the DB operation matching unit time of the corresponding task. Meanwhile, the thin character strings are data obtained from the DB operation matching time previous to the unit time of the corresponding task and are not necessary after the unit time. Therefore, this means the memory resource for this data can be released after the corresponding unit time.

(*) The small thick square indicates a context. A task is generated based on a context. This is represented by arranging the context in the left end of the pentagonal box which indicates a task execution start timing.

(*) It is assumed that a memory resource amount necessary to execute one task is set to "1" as in FIG. 7 for simplicity purpose although the number of fields inside the pentagonal box, which indicates tasks, is several.

(*) Since the memory resource amount necessary in the context is sufficiently smaller than the memory resource amount necessary to execute a task, it is assumed that the memory resource amount necessary in the context is set to zero.

Referring to FIG. 26, similarly in Embodiment 2, the DBMS 412 can avoid allocation of memory resources over the upper allocation limit (total allocatable memory resource amount 909). For example, the DBMS 412 executes the query execution plan of FIG. 5 as follows. It is noted that the first memory resource amount (the memory resource amount to be allocated to each of tasks newly generated) in the following determination processing of simultaneous-task-generation number is set to "1" according to the aforementioned description rule.

(t0) One context 25A for executing a new task that accesses Index A is generated. The DBMS 412 performs the determination processing of simultaneous-task-generation number based on the context 25A. For example, the DBMS 412 calculates the number of simultaneous task generation as "1" based on the number of generatable tasks set to "1" which is the same number as the number of target contexts, the first memory resource amount set to "1," and the second memory resource amount set to "6" (upper allocation limit "6"). The DBMS 412 generates tasks 24A with the same number as the calculated number of simultaneously generatable tasks. In addition, the DBMS 412 allocates a memory resource necessary in the corresponding DB operation to the task 24A based on the context 25A and executes the task 24A. The memory resources allocated to the tasks 24A match, for example, data necessary in overall DB operations from access to Index A to result generation in the query execution plan of FIG. 5 and correspond to five fields.

(t1) From the execution result of the tasks 24A, the DBMS 412 recognizes that it is necessary to fetch each of the data including two records of Table A. In this regard, the DBMS 412 generates one context 25B for executing a task for fetching data including one record (third record) of Table A. In addition, the DBMS 412 continuously fetches data including the other record (first record) of Table A through the task 24A. The continuous execution of the task 24A can be made because the memory resources necessary in the corresponding DB operation are allocated in advance. The DBMS 412 performs the determination processing of simultaneous-task-generation number based on the context 25B. For example, the DBMS 412 calculates the number of simultaneous task generation as "1" based on the number of generatable tasks set to "1" which is the same as the number of target contexts, the first memory resource amount set to "1," and the second memory resource amount set to "5" (value obtained by subtracting the allocated memory resource amount "1" from the upper allocation limit "6"). The DBMS 412 generates tasks 24B with the same number as the calculated number of simultaneously generatable tasks. In addition, the DBMS 412 allocates a memory resource necessary in the corresponding DB operation to the task 24B based on the context 25B and executes the task 24B. The memory resources allocated to the tasks 24B match, for example, data necessary in a series of DB operations from fetching data of Table A to result generation in the query execution plan of FIG. 5 and correspond to four fields.

(t2) From the execution result of the task 24A, the DBMS 412 recognizes that it is necessary to access Index B and search one RowID List. The DBMS 412 continuously performs the corresponding DB operation through the task 24A. Similarly, from the execution result of the task 24B, the DBMS 412 continuously performs the DB operation for accessing Index B and searching one RowID List through the task 24B.

(t3) From the execution result of the task 24A, the DBMS 412 recognizes that it is necessary to fetch each data including three records of Table B. In this regard, the DBMS 412 generates two contexts for executing each of the tasks for fetching each data including two records of Table B. In addition, the DBMS 412 continuously fetches data including the remaining one record of Table B through the task 24A. Similarly, from the execution result of the task 24B, the DBMS 412 recognizes that it is necessary to fetch each data including five records of Table B. In this regard, the DBMS 412 generates four contexts for executing each of the tasks for fetching each data including four records of Table B. In addition, the DBMS 412 continuously fetches data including the remaining one record of Table B through the task 24B. The DBMS 412 performs the determination processing of simultaneous-task-generation number based on the total of six generated contexts. For example, the DBMS 412 calculates the number of simultaneous task generation as "4" based on the number of generatable tasks set to "6" which is the same as the number of target contexts, the first memory resource amount set to "1," and the second memory resource amount set to "4" (value obtained by subtracting the allocated memory resource amount "2" from the upper allocation limit "6"). The DBMS 412 generates tasks 24C, 24D, 24E, and 24F with the same number as the calculated number of simultaneously generatable tasks. In addition, the DBMS 412 allocates memory resources necessary in the corresponding DB operation to each of the tasks 24C, 24D, 24E, and 24F based on four contexts out of the generated six contexts and executes the tasks. The memory resources allocated to each of the tasks 24C, 24D, 24E, and 24F match, for example, data necessary in a series of DB operations from fetching data of Table B to result generation in the query execution plan of Query 1 of FIG. 5 and correspond to two fields.

(t4) The six tasks executed at the timing t3 are completed, and a result of the query is generated. The DBMS 412 releases memory resources allocated to each of the six executed tasks and terminates the tasks (immediately after the timing t4). As a result, the second memory resource amount becomes "6." Therefore, the DBMS 412 performs the determination processing of simultaneous-task-generation number based on the two remaining contexts that are not used to generate the task. The DBMS 412 calculates the number of simultaneous task generation as "2" through this process and generates tasks with the same number as the calculated number of simultaneously generatable tasks. In addition, the DBMS 412 allocates memory resources necessary in the corresponding DB operation to the two generated tasks based on the two contexts used in the determination processing of simultaneous-task-generation number and executes the tasks.

(t5) Overall tasks executed until the timing t4 are completed, and a result of the query is generated.

In this manner, in Embodiment 2, similar to Embodiment 1, the allocated memory resource amount becomes equal to or smaller than the upper allocation limit "6" even when all of the generated tasks are executed in parallel. That is, it is possible to avoid exhaustion of memory resources allocated to a task. As described above, since the number of tasks generated simultaneously is set to be equal to the number of simultaneous task generation, it is possible to issue the data read request at the highest multiplicity within the upper allocation limit and thus reduce the query execution time.

Furthermore, in Embodiment 2, as in the tasks 24A and 24B, it is possible to execute a task without interruptedly allocating a memory resource from the start of execution of the task to result generation. In the memory resource allocation processing, a task execution waiting state may occur as shown in FIG. 16. Therefore, by preventing this process from being performed during execution of the task, it is possible to efficiently execute the initiated task. In addition, since a context serving as a basis of execution of a task newly generated is generated in advance, it is possible to prevent a task waiting for generation of a task, that may be generated when the allocated memory resource is allocated to the task. As a result, it is possible to execute a query without generating inefficient and wasteful memory resource allocation to a task. It is noted that the DBMS 412 may manage the contexts generated from an execution result of one task (for example, two contexts generated from the execution result of the task 24A at the timing t3) by integrating them into one context.

Figure 27:
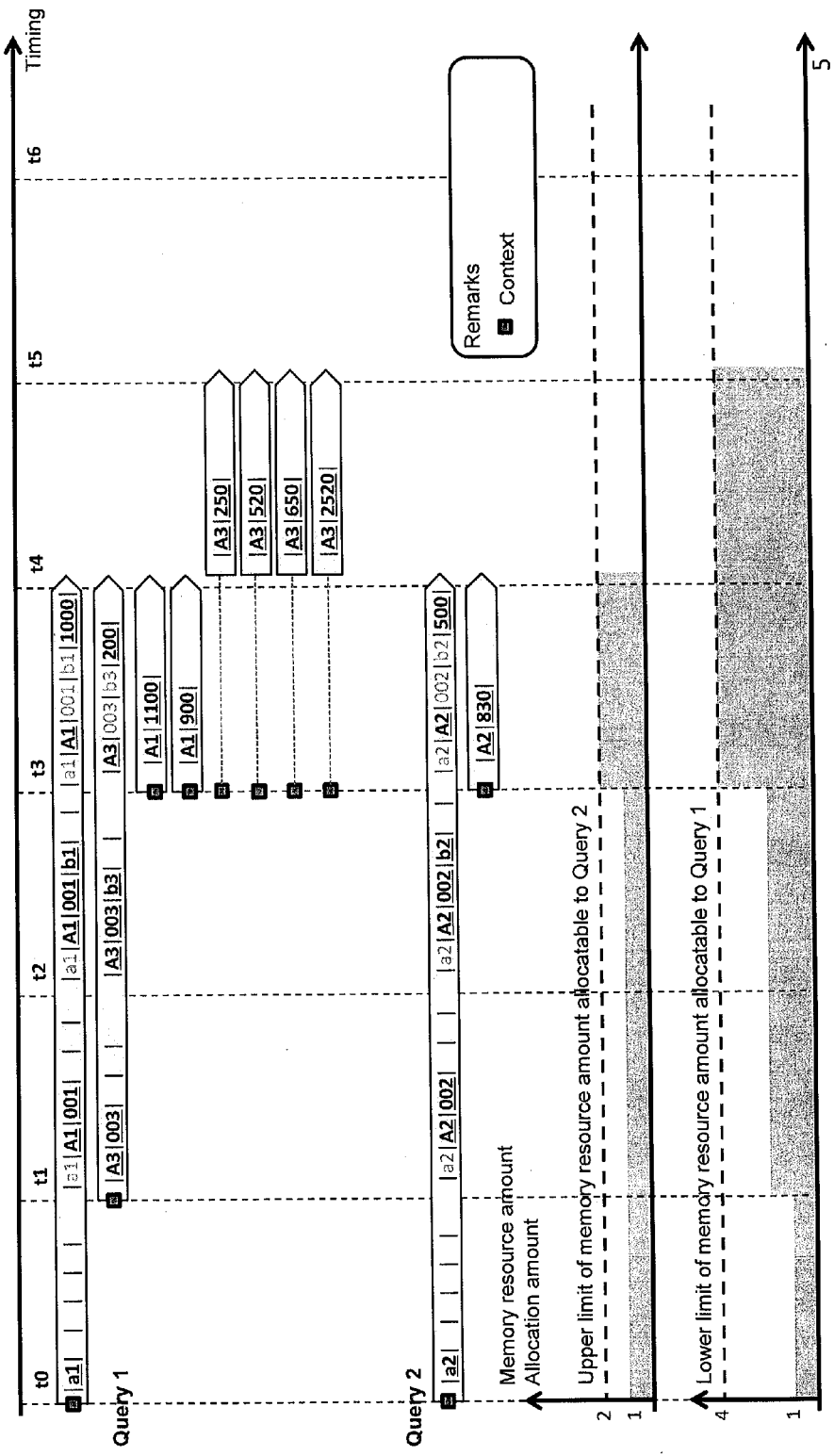
FIG. 27 is an exemplary schematic diagram showing how to avoid exhaustion of memory resources in concurrent execution of Query 1 and Query 2 in Embodiment 2.

Further, in Embodiment 2, similar to Embodiment 1, it is possible to avoid exhaustion of memory resources to be allocated to a task even when the DBMS 412 receives a plurality of queries and executes a plurality of the received queries in parallel. FIG. 27 is an exemplary schematic diagram showing a case where the DBMS 412 receives Query 1 of FIG. 3 and Query 2 of FIG. 4 simultaneously and executes both Queries 1 and 2 in parallel according to the query execution plan of FIGS. 5 and 6. A description rule is similar to that of FIG. 26. Similar to Embodiment 1, the DBMS 412 prepares priorities for each of the queries (partial queries) to be executed. As shown in FIG. 27, the DBMS 412 distributes the upper allocation limit "6" to each of the partial queries to be executed based on the priorities. In execution of each partial query, the determination processing of simultaneous-task-generation number is performed whenever a new task is generated. That is, the DBMS 412 determines the number of simultaneous task generation of each partial query based on the upper limit of the allocatable memory resource amount distributed to execution of each partial query. In execution of each partial query, by setting the number of the tasks newly generated to be equal to or smaller than the calculated number of simultaneously generatable tasks, it is possible to avoid exhaustion of memory resources to be allocated to a task.

Further, similar to FIGS. 7 to 9, FIGS. 26 and 27 are schematic diagrams showing an overview image of Embodiment 2, and the DBMS 412 may not initiate a plurality of tasks at the same timing.

Hereinafter, Embodiment 2 will be described in detail.

Figure 28:
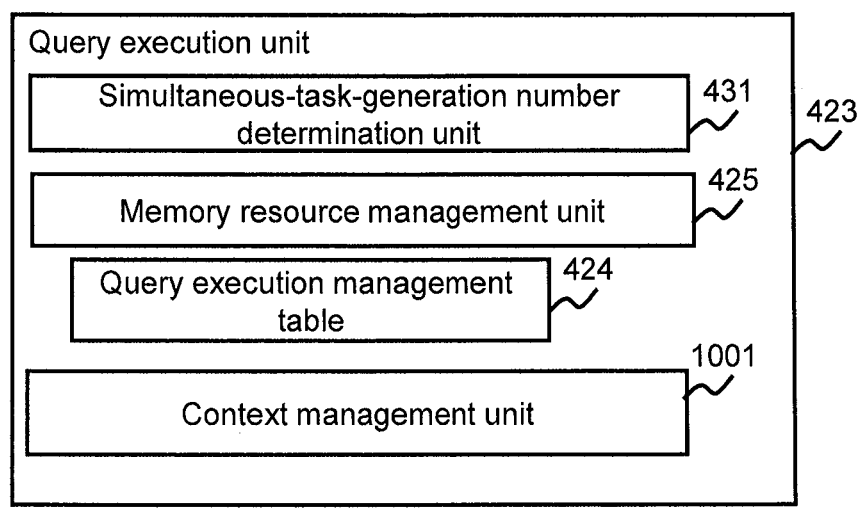
FIG. 28 shows a configuration of a query execution unit according to Embodiment 2.

FIG. 28 shows a configuration of the query execution unit 423 according to Embodiment 2.

The query execution unit 423 further includes a context management unit 1001. The context management unit 1001 manages a context generated based on an execution result of a task.

Figure 29:
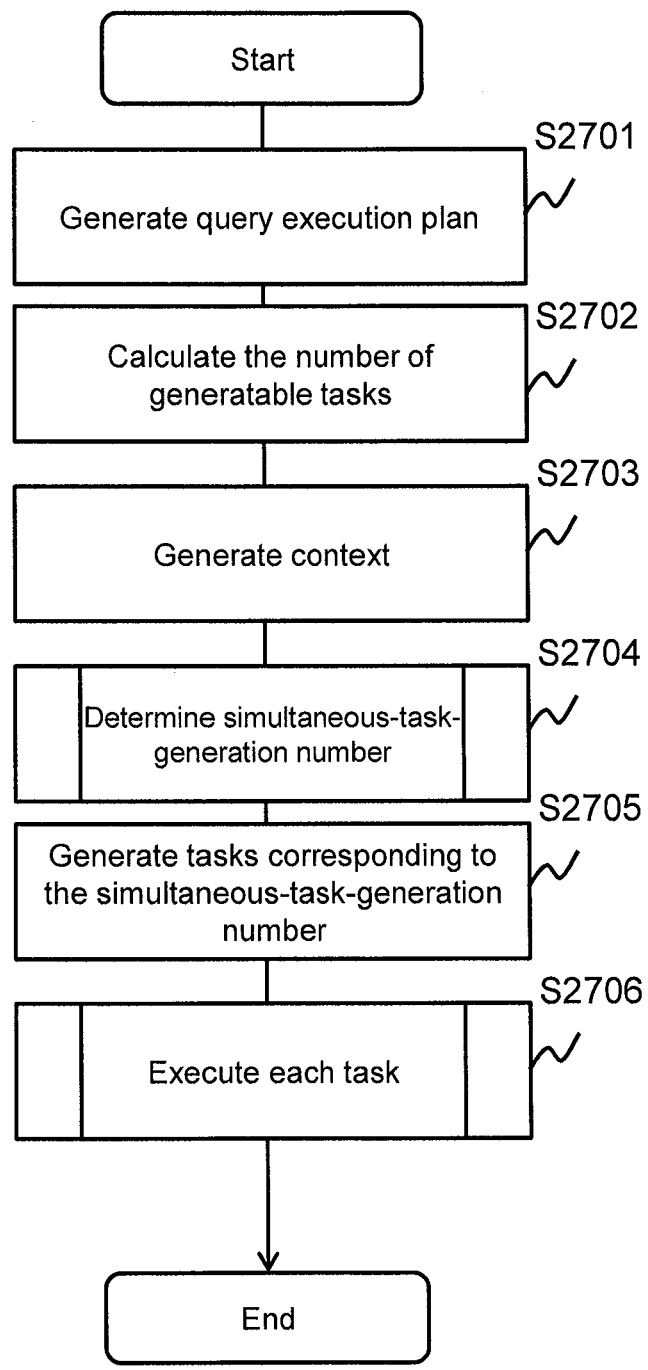
FIG. 29 shows a flow of the entire query execution according to Embodiment 2.

FIG. 29 shows a general flow of a process of creating and executing a task when the DBMS 412 executes the received query in Embodiment 2.

In S2701 and S2702, the query execution unit 423 performs a process similar to S1001 and S1002 of FIG. 12. In S2702, the query execution unit 423 sets the number of partial queries executable in parallel by a plurality of tasks to the number of generatable tasks and calculates the number of generatable tasks.

In S2703, the query execution unit 423 (context management unit 1001) generates contexts with the same number as the number of generatable tasks calculated in S2702. Each of the generated contexts is for executing the corresponding task by matching each of the tasks that perform the top DB operation of each partial query. In a specific process of creating the contexts, the query execution unit 423 (memory resource management unit 425) calculates the amount of memory resources necessary in the contexts and reserves the calculated amount of memory resources. In addition, the query execution unit 423 allocates memory resources to execution of the corresponding partial queries (performs a process similar to the memory resource reservation processing of FIG. 18 and the memory resource allocation processing of FIG. 16). The query execution unit 423 sets information necessary to execute the task newly generated in the context (allocated memory resource) and manages the context management unit 1001. Through a process similar to those of FIGS. 18 and 16, the amount of memory resources used as the context is managed as the allocated memory resource amount 906 and the reserved memory resource amount 907 of the corresponding partial query in the query execution management table 424. It is noted that the amount of memory resources necessary in the context is sufficiently smaller than the first memory resource amount which is a memory resource amount necessary to allocate memory resource to each of the tasks newly generated. For this reason, reservation and allocation of the memory resources necessary in the context are successful in many cases. If reservation and allocation of memory resources necessary in the context fails, the query execution unit 423 (memory resource management unit 425) repeats the reservation and allocation processings until the necessary memory resource amount is obtained. In this case, when a predetermined time elapses from the execution start time 904 of any partial query, the query execution unit 423 may terminate execution of the query including the corresponding partial query with an error.

In S2704, the query execution unit 423 (simultaneous-task-generation number determination unit 431) performs the determination processing of simultaneous-task-generation number based on the context generated in S2703. It is noted that, in the determination processing of simultaneous-task-generation number according to Embodiment 2, the first memory resource amount is calculated based on the amount of memory resources necessary in the subsequent DB operations until the result generation, corresponding to the task newly generated from the context generated in S2703. In the part other than the computation of the first memory resource amount, the determination processing of simultaneous-task-generation number performed in S2704 is substantially similar to the determination processing of simultaneous-task-generation number of FIG. 15 described in Embodiment 1.

In S2705, the query execution unit 423 performs a process similar to S1004 of FIG. 12 to generate tasks with the same number as the number of simultaneous task generation determined in S2704.

Figure 30:
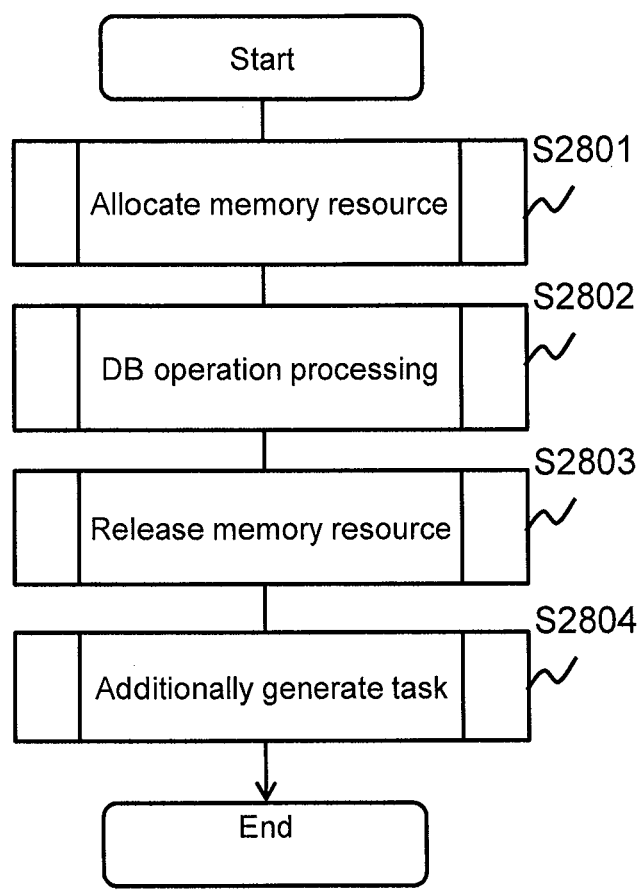
FIG. 30 shows a flow of a task execution processing according to Embodiment 2.

In S2706, the query execution unit 423 performs a task execution processing for each of the tasks generated in S2705 based on each of the contexts generated in S2703. The task execution processing of Embodiment 2 is different from the task execution processing of Embodiment 1 in that a context is generated and used. Details are shown in FIG. 30. It is noted that the query execution unit 423 may release the memory resource of the corresponding context (perform the memory resource release processing of FIG. 17) at the timing of starting to execute the task based on the context. The query execution unit 423 terminates the process of FIG. 29 after starting the task execution processing for each of the tasks.

FIG. 30 shows a flow of the task execution processing (S2706 of FIG. 29, S2909 of FIG. 31, and S3005 of FIG. 32) according to Embodiment 2. FIG. 30 shows a flow of one exemplary task (referred to as a "object task" in the description for FIG. 30).

In S2801, the query execution unit 423 (memory resource management unit 425) performs a memory resource allocation processing. This process is performed based on the context for executing the object task (context generated through S2703 of FIG. 29 or S2906 of FIG. 31). The query execution unit 423 (memory resource management unit 425) performs a process substantially similar to the memory resource allocation processing of FIG. 16. In this process, the new allocation memory resource amount (memory resource amount necessary to execute the object task) is a memory resource amount specified based on the context and is a memory resource amount for actually executing the subsequent DB operations until result generation, corresponding to the object task.

In S2802, the query execution unit 423 performs a process of executing the DB operation corresponding to the task based on the context for executing the object task. This process will be referred to as a DB operation processing. Details of the DB operation processing are shown in FIG. 31.

In S2803, the query execution unit 423 (memory resource management unit 425) performs a process of releasing releasable memory resources for the object task subjected to the DB operation processing. This process is similar to the memory resource release processing of FIG. 17.

Figure 32:
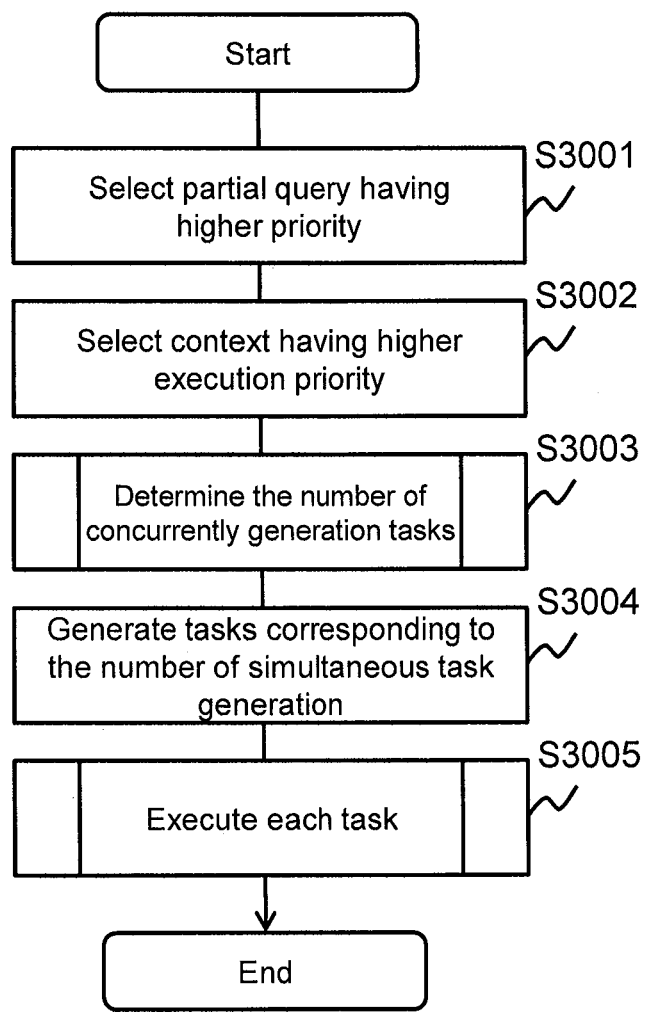
FIG. 32 shows a flow of an additional task generation processing according to Embodiment 2.

In S2804, the query execution unit 423 performs an additional task generation processing for additionally creating a task as the unreserved memory resource amount 908 increases through the process of S2803. This process is performed based on a context not used in execution of a task, managed by the context management unit 1001. Details of the additional task generation processing are shown in FIG. 32. The query execution unit 423 may instruct the execution task management unit 426 to terminate the object task as the process of S2804 is initiated.

Figure 31:
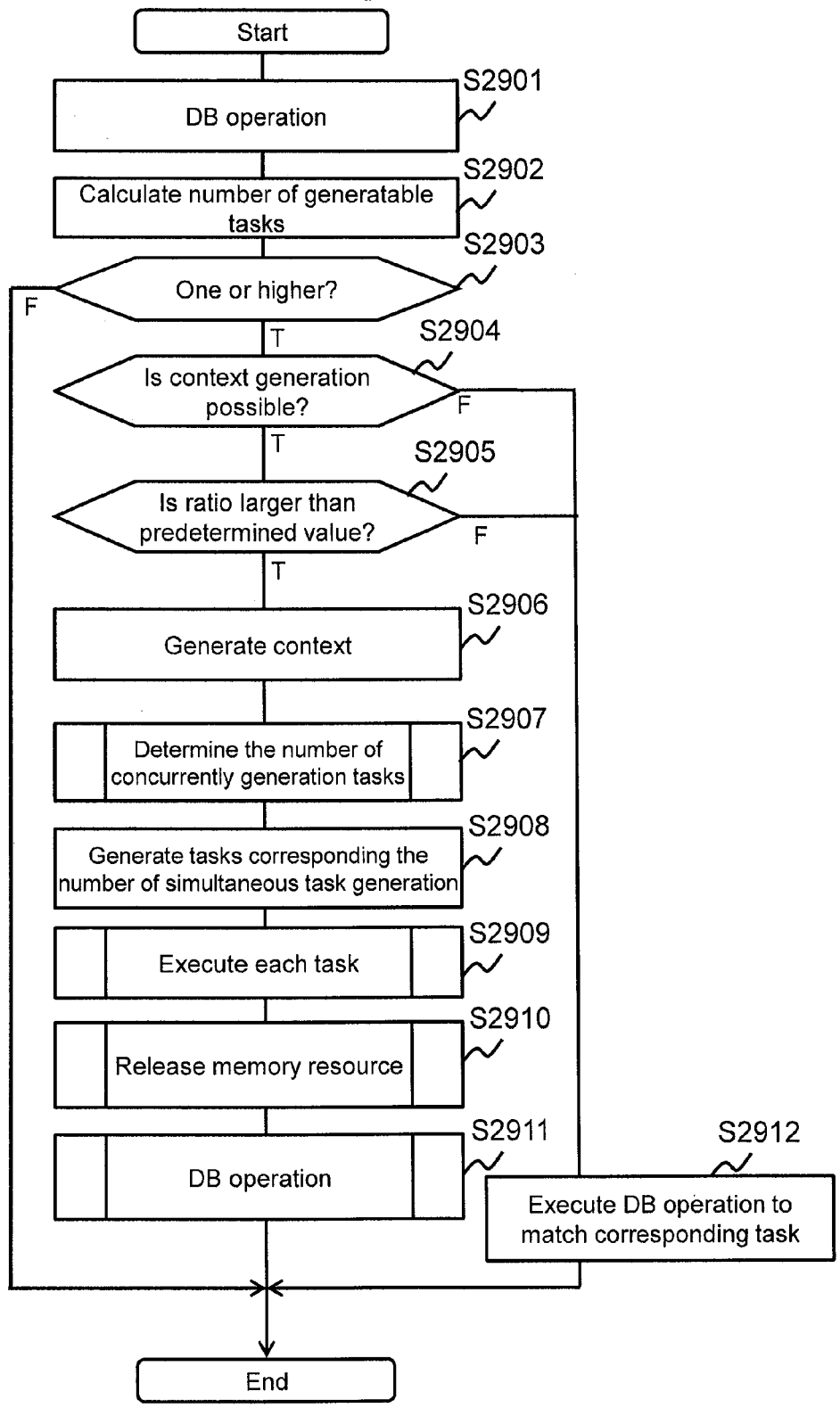
FIG. 31 shows a flow of a DB operation processing according to Embodiment 2.

FIG. 31 shows a flow of a DB operation processing (S2802 of FIG. 30 and S2911 of FIG. 31) according to Embodiment 2. In the description for FIG. 31, a DB operation serving as a processing target will be referred to as a "processing target DB operation," and a partial query including the processing target DB operation will be referred to as a "object partial query." In addition, a task corresponding to the processing target DE operation will be referred to as an "object task."

In S2901, the query execution unit 423 performs a process similar to S1102 of FIG. 13 to execute the processing target DB operation. In Embodiment 1, information for executing a DB operation is based on information of a task serving a task creating source. However, in Embodiment 2, the information for executing a DB operation is based on information of a context and an object task.

In S2902, the query execution unit 423 performs a process similar to S1103 of FIG. 13 to calculate the number of generatable tasks based on the execution result of the processing target DB operation of S2901. That is, the query execution unit 423 calculates the number of tasks that can be newly generated in order to perform a DB operation next to the processing target DB operation in the query execution plan.

In S2903, the query execution unit 423 determines whether or not the number of generatable tasks calculated in S2902 is equal to or greater than "1." If it is determined YES, the query execution unit 423 performs S2904. If it is determined NO, the query execution unit 423 terminates the process.

In S2904, the query execution unit 423 determines whether or not a context can be generated. This determination is performed based on the following conditions (x) and (y):

(x) a ratio of the total number of contexts regarding execution of the object partial query against a predetermined number; and
(y) whether or not a memory resource necessary in the context can be reserved (depending on the memory resource reservation processing of FIG. 18).

For example, if the ratio of (x) exceeds a predetermined value, or if the reservation of (y) is not available, the query execution unit 423 sets the result of determination to NO in S2904. If any one of the aforementioned conditions is not satisfied, the query execution unit 423 may sets the result of determination to YES in S2904. If it is determined YES, the query execution unit 423 performs S2905. If it is determined NO, the query execution unit 423 performs S2912.

In S2905, the query execution unit 423 determines whether or not a ratio between the number of DB operations from the processing target DB operation to the subsequent result generation in the object partial query and the number of DB operations from the top DB operation of this partial query to the result generation is greater than a predetermined value. If this ratio is high, a lot of DB operations exist until the result generation. Meanwhile, if this ratio is low, the number of DB operations until the result generation is small. Therefore, if this ratio is high, a possibility of dynamically creating tasks depending on the number of DB operations is improved, so that it is possible to parallelize the data read request (reduction of query execution time). Meanwhile, if this ratio is low, the possibility of dynamically creating tasks decreases compared to a case where this ratio is high. If it is determined YES in S2905, the query execution unit 423 performs S2906. If it is determined NO in S2905, the query execution unit 423 performs S2912.

In S2906, the query execution unit 423 generates contexts as many as a number decremented by "1" from the number of generatable tasks calculated in S2902. Each of the generated contexts matches a task for performing the DB operation next to the processing target DB operation and includes information for executing the corresponding task based on an execution result of S2901. A process of creating the contexts is similar to S2703 of FIG. 29. The query execution unit 423 continuously executes the remaining one of the next DB operations described above using the object task (S2911 described below). It is noted that, if the number of contexts to be generated is zero (if the number of generatable tasks is 1), the query execution unit 423 does not perform anything at all in S2907, S2908, and S2909 described below, and advances to S2910.

In S2907, the query execution unit 423 performs the determination processing of simultaneous-task-generation number similar to S2704 of FIG. 29 based on the contexts generated in S2906.

In S2908, the query execution unit 423 performs a process similar to S1004 of FIG. 12 to generate tasks with the same number as the number of simultaneous task generation determined in S2907.

In S2909, the query execution unit 423 performs a task execution processing (FIG. 30) in parallel for each task generated in S2908 based on each context generated in S2906.

In S2910, the query execution unit 423 releases releasable memory resources out of the memory resources allocated to the corresponding task for performing the next S2911 for the object task (memory resource release processing of FIG. 17). For example, out of the character strings inside the pentagonal box indicating execution of a task shown in FIG. 26, a memory resource having a field represented by a thin character string at a certain unit time may be released. This is because data stored in this memory resource is a result of the DB operation executed before the corresponding unit time and is data not used in result generation.

In S2911, the query execution unit 423 continuously executes the one remaining in S2906 out of the DB operations next to the processing target DB operation by matching the object task. That is, the query execution unit 423 performs the DB operation of FIG. 31 again.

If it is determined NO in S2904 and S2905, the query execution unit 423 executes overall DB operations relating to the execution result of the processing target DB operation by matching one object task in S2912. In this case, the query execution unit 423 does not generate a new context and a new task. For the object task, necessary memory resources are allocated to the DB operations until result generation subsequent to the processing target DB operation is reached. For this reason, using the object task, it is possible to execute overall DB operations relating to the execution result of the processing target DB operation.

It is noted that the query execution unit 423 may perform determination of S2904 and S2905 based on each execution result of the overall relating DB operations described above in S2912. In this case, from an execution result of any DB operation, the query execution unit 423 may perform the process of S2906 to S2911 when generation of the context is possible based on the determination of S2904 and S2905. That is, the query execution unit 423 may generate a context again, generate a task based on this context, and execute the task.

FIG. 32 shows a flow of an additional task generation processing (S2804 of FIG. 30) according to Embodiment 2.

Similar to FIG. 25 of Embodiment 1, the additional task generation processing starts, for example, in response to at least one of the following events (1) to (3):

(1) the total allocatable memory resource amount 909 or the unreserved memory resource amount 908 of the query execution management table 424 increases;
(2) for any partial query of the query execution management table 424, the priority 901 changes, or the top priority flag 902 is asserted; and
(3) a predetermined time elapses.

It is noted that this additional task generation processing may be repeated until there is no context not used in execution of a task for overall partial queries of the query execution management table 424 when the unreserved memory resource amount 908 of the query execution management table 424 is equal to or greater than a predetermined value.

In S3001, the query execution unit 423 selects a partial query having a top priority 901 out of partial queries existing in a context not used in execution of a task by referencing the query execution management table 424.

In S3002, the query execution unit 423 selects one or more contexts having a high execution priority out of a group of contexts generated in execution of the partial query selected in S3001. For example, the query execution unit 423 selects one or more contexts having the smallest number of the DB operations subsequent to the corresponding DB operation out of the DB operations executed in the task corresponding to the context.

In S3003, the query execution unit 423 performs the determination processing of simultaneous-task-generation number similar to S2704 of FIG. 29 based on one or more contexts selected in S3002.

In S3004, the query execution unit 423 performs a process similar to S1004 of FIG. 12 to generate tasks with the same number as the number of simultaneous task generation determined in S3003.

In S3005, the query execution unit 423 performs the task execution processing of FIG. 30 based on each context selected in S3002 for each of the tasks generated in S3004. It is noted that the query execution unit 423 may release a memory resource of a context at the timing of starting execution of a task based on the context (performs the memory resource release processing of FIG. 17).

[Embodiment 3]

Embodiment 3 will be described below. Differences from Embodiments 1 and 2 will be mainly described, and description on points common with Embodiments 1 and 2 will be omitted or simplified.

Figure 33:
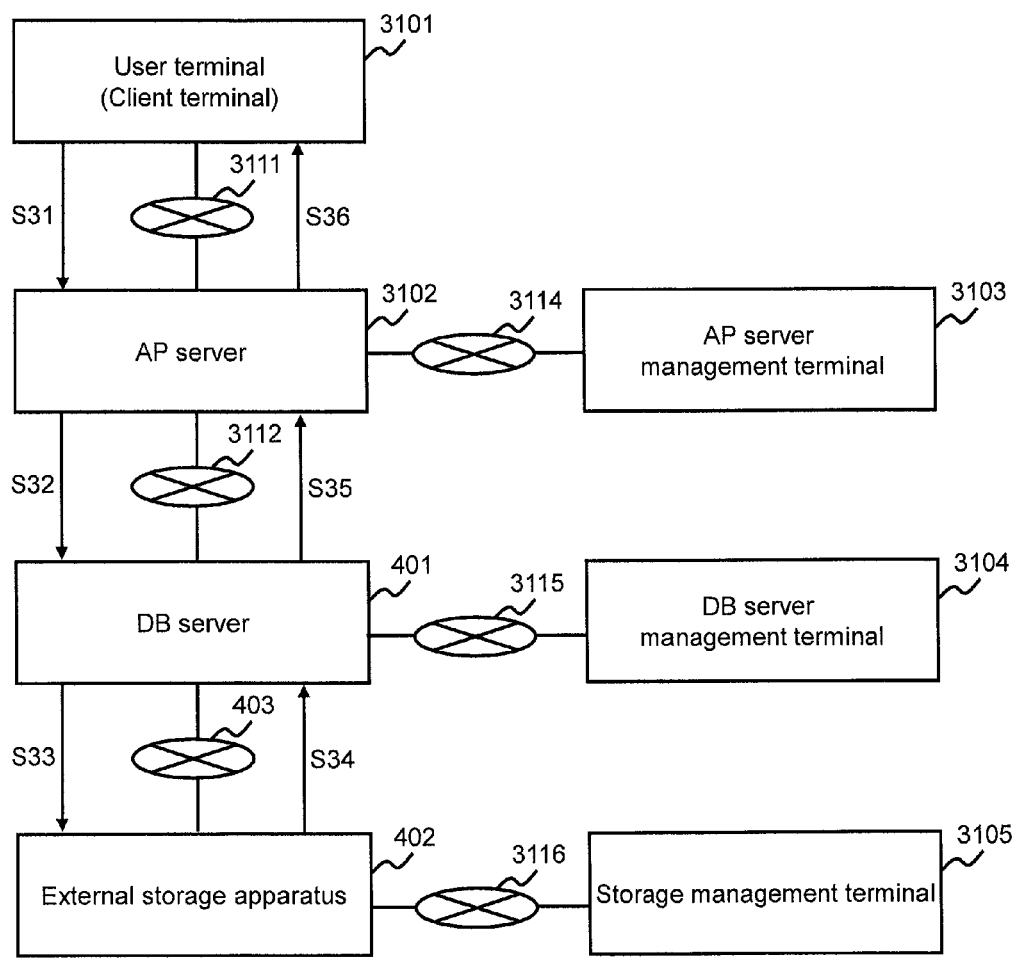
FIG. 33 shows a configuration of a computer system according to Embodiment 3.

FIG. 33 shows the configuration of a computer system according to Embodiment 3.

An application server (hereinafter, AP server) 3102 is communicably coupled to the DB server 401 via a communication network 3112. The DB server 401 is communicably coupled to the external storage apparatus 402 via the communication network 403. A user terminal (a client terminal) 3101 is communicably coupled to the AP server 3102 via a communication network 3111. The DB server 401 executes the DBMS 412 that manages the DB 451. The external storage apparatus 402 stores the DB 451. The AP server 3102 executes an AP for issuing a query to the DBMS 412 executed by the DB server 401. The user terminal 3101 issues a request to the AP executed by the AP server 3102. Note that a plurality of the user terminals 3101 and a plurality of the AP server 3102 may be present.

An AP server management terminal 3103 is coupled to the AP server 3102 via a communication network 3114. The DB server management terminal 3104 is coupled to the DB server 401 via a communication network 3115. The storage management terminal 3105 is coupled to the external storage apparatus 402 via a communication network 3116. The AP server management terminal 3103 is a terminal that manages the AP server 3102. The DB server management terminal 3104 is a terminal that manages the DB server 401. The storage management terminal 3105 is a terminal that manages the external storage apparatus 402. A DB server administrator or user may set, from the DB server management terminal 3104, the priority 901, the highest priority flag 902, and the like corresponding to a partial query in the query execution management table 424. Note that at least two of the management terminals 3103 to 3105 may be common (integral). At least two of the communication networks 3111, 3112, 3114, 3115, 3116, and 403 may be common (integral).

In Embodiment 3, processing is executed as described below.

(S31) The user terminal 3101 issues a request (hereinafter, user request) to the AP server 3102.

(S32) The AP server 3102 generates a query according to the user request received in S31. The AP server 3102 issues the generated query to the DB server 401.

(S33) The DB server 401 receives the query from the AP server 3102 and executes the received query. The DB server 401 issues a data input and output request (e.g., a data read request), which is necessary in the execution of the received query, to the external storage apparatus 402. The DB server 401 sometimes issues a plurality of data input and output requests in parallel in execution of one query. Therefore, the DB server 401 sometimes performs the request in S33 a plurality of times in parallel in the execution of one query.

(S34) The external storage apparatus 402 responds to the DB server 401 concerning the data input and output request issued in S33. The external storage apparatus 402 sometimes performs the response in S34 a plurality of times in parallel.

(S35) The DB server 401 generates an execution result of the query and transmits the execution result to the AP server 3102.

(S36) The AP server 3102 receives the execution result of the query. The AP server 3102 transmits an answer to the user request received in S31, which conforms to the execution result, to the user terminal 3101.

Note that a plurality of the user requests issued to the AP server 3102 or a plurality of the queries issued to the DB server may be simultaneously present.

The several embodiments are described above. However, the present invention is not limited to these embodiments. It goes without saying that the embodiments can be variously changed without departing from the spirit of the present invention.

REFERENCE SIGNS LIST

412 Database management system (DBMS)

The invention claimed is:

1. A database management system for managing a database, the database management system comprising:
   a memory coupled to a processor, the memory storing instructions, that when executed by the processor, cause the processor to:
   receive a query to the database,
   generate a query execution plan including information indicating one or more database operations necessary to execute the received query,
   execute the received query based on the generated query execution plan,
   wherein the memory further stores instructions that when executed by the processor, cause the processor to:
   dynamically generate a task for executing a database operation in execution of the received query,
      calculate a first number of tasks to be generated based on the query execution plan,
   calculate a memory reservation amount based on a product of a first memory resource amount which is an amount of memory resources necessary to be allocated per a newly generated task and the first number of tasks, allocate memory resources based on the calculated memory reservation amount, calculate a second number of tasks to be executed simultaneously, which is less than the calculated first number of tasks, based on a difference between the first memory resource amount and the allocated memory resources, the second number of tasks to be calculated when newly generating the task during execution of the query, execute the second number of tasks simultaneously, and release the allocated memory resources after the execution of the second number of tasks, wherein the memory further stores instructions that when executed by the processor, cause the processor to:

when newly generating the task, generate a context, execute the calculation of the number of tasks based on the generated context, and execute the generated task based on the generated context, and wherein the context includes first information indicating which of one or more database operations, as information included in the query execution plan, corresponds to a database operation that initiates execution in the task newly generated, second information regarding a data access destination necessary in the database operation indicated by the first information, and third information regarding data necessary to generate a result regarding the one or more database operations from the task newly generated.

2. The database management system according to claim 1, wherein the memory further stores instructions that when executed by the processor, cause the processor to:

when executing two or more partial queries in parallel, in executing the one or more queries in parallel, initiating execution in parallel by a separate task, and the two or more partial queries are included in execution of the one or more queries, perform the determination processing of task-generation number when newly generating a task in execution of each of the two or more partial queries.

3. The database management system according to claim 2, wherein the memory further stores instructions that when executed by the processor, cause the processor to:

in the calculation of the second number of tasks, in execution of one of the two or more partial queries, a second memory resource amount, which is an amount of memory resources that can be newly allocated, is the smaller of fourth and fifth memory resource amounts, wherein the fourth memory resource amount is an amount obtained by subtracting a reserved memory resource amount, which is a total sum of the reservation memory resource amount corresponding to the one partial query, from an amount of memory resources which can be allocated to the execution of the one partial query, the amount of memory resources being obtained by distributing a total memory resource amount, which is a total sum of memory resources allocatable to execution of all the partial queries depending on priorities corresponding to each of the two or more partial queries, and wherein the fifth memory resource amount is an unreserved memory resource amount obtained by subtracting a total sum of the two or more reserved memory resource amounts corresponding to execution of the two or more partial queries from the total memory resource amount.

4. The database management system according to claim 3, wherein the memory further stores instructions that when executed by the processor, cause the processor to:

dynamically change the priority of the partial query based on at least one of a target execution time, an execution progress rate, and a query execution time for each of the partial queries.

5. The database management system according to claim 3, wherein the memory further stores instructions that when executed by the processor, cause the processor to:

change the priority of the partial query in accordance with information received using an input interface that receives a change of the priority of the partial query.

6. The database management system according to claim 1, wherein the memory further stores instructions that when executed by the processor, cause the processor to:

when executing the generated task, allocate memory resources whose amount is based on the first memory resource amount, to the generated task, from the memory resources reserved in the reservation processing, and when terminating execution of the generated task, release the memory resources allocated to the generated task and cancel the reservation of the memory resources.

7. The database management system according to claim 1, wherein the memory further stores instructions that when executed by the processor, cause the processor to:

calculate the second number of tasks when the task is newly generated based on a result of execution of a database operation corresponding to the executed task.

8. The database management system according to claim 1, wherein the memory further stores instructions that when executed by the processor, cause the processor to:

calculate the number of second tasks using the generated context when the second memory resource amount increases.

9. The database management system according to claim 8, wherein the memory further stores instructions that when executed by the processor, cause the processor to:

generate the context when a ratio of the number of subsequent database operations up to result generation from the database operation that initiates execution in the task newly generated, to a total number of the database operations up to the result generation out of the one or more database operations is greater than a predetermined value.

10. The database management system according to claim 8, wherein the memory further stores instructions that when executed by the processor, cause the processor to:

execute the subsequent database operations using the task under execution without generating the context and a new task when a ratio of the number of subsequent database operations up to result generation from the database operation that initiates execution in the new generated task, to a total number of the database operations up to the result generation out of the one or more database operations is equal to or smaller than a predetermined value.

11. The database management system according to claim 1, wherein memory further stores instructions that when executed by the processor, cause the processor to:

wherein the first memory resource amount is a memory resource amount necessary to execute subsequent database operations up to result generation from a database operation that initiates execution in the task newly generated out of one or more database operations which is information included in the query execution plan.

12. The database management system according to claim 11, wherein the memory further stores instructions that when executed by the processor, cause the processor to:
when executing the generated task, allocate memory resources whose amount is based on the first memory resource amount to the task to be executed, and execute the subsequent database operations.

13. A computer comprising:
a memory; and
a control device which is coupled to the memory and configured to:
receive a query to a database,
generate a query execution plan including information representing one or more database operations necessary to execute the reserved query, and
execute the received query based on the generated query execution plan,
wherein the control unit is further configured to:
dynamically generate a task for executing a database operation in execution of the received query,
calculate a first number of tasks to be generated based on the query execution plan,
calculate a memory reservation amount based on a product of a first memory resource amount which is an amount of memory resources necessary to be allocated per a newly generated task and the first number of tasks,
allocate memory resources based on the calculated memory reservation amount,
calculate a second number of tasks to be executed simultaneously, which is less than the calculated first number tasks, based on a difference between the first memory resource amount and the allocated memory resources, the second number of tasks to be calculated when newly generating a task during execution of the query,
execute the second number of tasks simultaneously, and
release the allocated memory resources after the execution of the second number of tasks,
wherein the control unit is further configured to:
when newly generating the task, generate a context, execute the calculation of the number of tasks based on the generated context, and execute the generated task based on the generated context, and
wherein the context includes first information indicating which of one or more database operations, as information included in the query execution plan, corresponds to a database operation that initiates execution in the task newly generated, second information regarding a data access destination necessary in the database operation indicated by the first information, and third information regarding data necessary to generate a result regarding the one or more database operations from the task newly generated.

14. The computer according to claim 13,
wherein the control device is further configured to:
when executing two or more partial queries in parallel, in executing the one or more queries in parallel, initiating execution in parallel by a separate task, and the two or more partial queries are included in execution of the one or more queries, and
perform the determination processing of task-generation number when newly generating a task in execution of each of the two or more partial queries.

15. The computer according to claim 14,
wherein, in the calculation of the second number of tasks during execution of one of the two or more partial queries, a second memory resource amount, which is an amount of memory resources that can be newly allocated, is the smaller of fourth and fifth memory resource amounts,
wherein the fourth memory resource amount is an amount obtained by subtracting a reserved memory resource amount, which is a total sum of the reservation memory resource amount corresponding to the one partial query, from an amount of memory resources which can be allocated to execution of the one partial query, the amount of memory resources being obtained by distributing a total memory resource amount, which is a total sum of memory resources allocatable to execution of all the partial queries depending on priorities corresponding to each of the two or more partial queries, and
wherein the fifth memory resource amount is an unreserved memory resource amount obtained by subtracting a total sum of the two or more reserved memory resource amounts corresponding to execution of the two or more partial queries from the total memory resource amount.

16. A database management method for managing a database, the database management method comprising:
receiving a query to the database;
creating a query execution plan including information indicating one or more database operations necessary to execute the received query; and
executing the received query based on the generated query execution plan,
wherein the execution of the received query includes:
dynamically generating a task for executing a database operation,
calculating a first number of tasks to be generated based on the query execution plan,
calculating a memory reservation amount based on a product of a first memory resource amount which is an amount of memory resources necessary to be allocated per a newly generated task and the first number of tasks, and
allocating memory resources based on the calculated memory reservation amount,
when newly generating the task in execution of the query, calculating a second number of tasks to be executed simultaneously, which is less than the first number of tasks, based on a difference between the first memory resource amount and the allocated memory resources,
executing the second number of tasks simultaneously, and
releasing the allocated memory resources after the execution of the second number of tasks,
wherein, the execution of the query further includes, when newly generating the task, generating a context, executing the calculation of the number of tasks based on the generated context, and executing the generated task based on the generated context, and
wherein the context includes first information indicating which of one or more database operations, as information included in the query execution plan, corresponds to a database operation that initiates execution in the task newly generated, second information regarding a data access destination necessary in the database operation indicated by the first information, and third information regarding data necessary to generate a result regarding the one or more database operations from the task newly generated.

* * * * *